(12) United States Patent
Oguchi et al.

(10) Patent No.: US 6,340,976 B1
(45) Date of Patent: Jan. 22, 2002

(54) MULTIVISION SYSTEM, COLOR CALIBRATION METHOD AND DISPLAY

(75) Inventors: Mariko Oguchi; Masayuki Saito; Kimiyoshi Miyata, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/367,556

(22) PCT Filed: Apr. 15, 1998

(86) PCT No.: PCT/JP98/01709

§ 371 Date: Aug. 17, 1999

§ 102(e) Date: Aug. 17, 1999

(87) PCT Pub. No.: WO99/53693

PCT Pub. Date: Oct. 21, 1999

(51) Int. Cl.[7] .................................. G09G 5/02
(52) U.S. Cl. .................. 345/690; 345/22; 348/602; 382/167
(58) Field of Search ................. 345/147, 150, 345/112, 214, 30, 1, 590, 597, 617, 690, 22, 72, 93, 88; 348/254, 602, 687, 799, 808, 778, 70, 268–269, 802, 807; 315/10; 382/162–163, 167; 358/515–521

(56) References Cited

U.S. PATENT DOCUMENTS

| | | | | |
|---|---|---|---|---|
| 4,688,079 A | * | 8/1987 | Fendley | 358/10 |
| 4,962,418 A | | 10/1990 | Kamaga | |
| 5,136,390 A | | 8/1992 | Inova et al. | |
| 5,249,056 A | * | 9/1993 | Foung | 348/254 |
| 5,270,818 A | * | 12/1993 | Ottenstein | 348/687 |
| 5,315,378 A | | 5/1994 | Satou et al. | |
| 5,321,494 A | * | 6/1994 | Donahue | 356/218 |
| 5,479,186 A | | 12/1995 | McManus et al. | 345/11 |
| 5,499,040 A | * | 3/1996 | McLaughlin et al. | 345/146 |
| 5,510,851 A | | 4/1996 | Foley et al. | |
| 5,612,710 A | * | 3/1997 | Christensen | 348/808 |
| 6,262,710 B1 | * | 7/2001 | Smith | 345/150 |

FOREIGN PATENT DOCUMENTS

| | | |
|---|---|---|
| EP | 0313795 A1 | 5/1989 |
| EP | 0543332 A2 | 5/1993 |
| EP | 0616473 A2 | 9/1994 |
| JP | 63261327 | 10/1988 |
| JP | 4243393 | 8/1992 |
| JP | 4285992 | 10/1992 |
| JP | 5119752 | 5/1993 |
| JP | 5236371 | 9/1993 |
| JP | 6178244 | 6/1994 |
| JP | 6311428 | 11/1994 |
| JP | 7672817 | 3/1995 |
| JP | 71911649 | 7/1995 |
| JP | 7236105 | 9/1995 |
| JP | 7301844 | 11/1995 |
| JP | 8336055 | 12/1996 |
| JP | 927916 | 1/1997 |
| JP | 10906645 | 4/1998 |

\* cited by examiner

*Primary Examiner*—Matthew Luu
*Assistant Examiner*—Wesner Sajous

(57) ABSTRACT

A multi-vision system includes chromaticity sensors for performing colorimetry of a plurality of display units. From colorimetry results obtained from the chromaticity sensors, a color conversion coefficient calculation unit inside a color calibration unit calculates the color conversion coefficient that is characteristic of each display unit. Calculated color conversion coefficients are stored in a color processing unit. The color calibration for this multi-vision system displays representing colors without a color conversion, and from colorimetry results of the representing colors for all the display units, a target color is decided automatically. For all display units, the color conversion coefficients are automatically calculated so that the representing colors are able to be displayed as a target color.

20 Claims, 18 Drawing Sheets

MULTIVISION SYSTEM, COLOR CALIBRATION METHOD AND DISPLAY

This application is the national phase under 35 U.S.C. §371 of PCT International Application No. PCT/JP98/01709 which has an International filing date of Apr. 15, 1998 which designated the United States of America.

TECHNICAL FIELD

The present invention relates to color calibration of a display device and a multi-vision system comprising a plurality of display units.

BACKGROUND ARTS

FIGS. 16 and 17 from Japanese unexamined patent publication Hei7-72817 illustrate a part of the cross-sectional diagram and the block chart of an important part for the conventional multi-vision brightness control apparatus comprising the plurality of display units.

Also, FIG. 18 is the flow chart showing an operation of the same multi-vision brightness control apparatus.

Description to the numbered components indicated in FIGS. 16 and 17 follows: a screen R1; a sensor R3 for detecting the brightness of an outer rim; a wall R5; a ceiling R6; a storage shelf R7; a skylight R31; a projection unit R8; a lens block R9 of the projection unit R8; a control board R10 of the projection unit R8; a Braun tube R11 of the projection unit R8; a console panel R12 of the projection unit R8; and a lead wire R13 for transmitting signal of the sensor R3 to the control board.

There are a plurality of screens R1 and projection units R8. There is one projection unit R8 for every one of the screens R1. An image from the projection unit R8 is projected to the screen R1. The sensor R3 is arranged at the outer rim of a screen frame, and the sensor R3 detects a beam brightness being illuminated to the screen frame. Brightness information detected by the sensor R3 is transmitted to the control board R10 via the lead wire R13, and the brightness information is stored and used for calculation for setting the brightness to the Braun tube R11.

Following is a detailed description for the operation of the multi-vision brightness control apparatus comprising the above-mentioned configuration with reference to FIG. 18.

First of all, the multi-vision brightness control apparatus is powered on (step 101). Next, a content of a memory device inside a control circuit is cleared to 0 (step 102), and when a certain time has lapsed (step 103), a time counter t is cleared to 0 (step 104). The sensor R3 detects a surrounding brightness (step 105), and the brightness information of the surrounding is input to the control board R10 via the lead wire 13. The control board R10 calculates a minimum brightness values of the Braun tube R11 (step 106) so that it is easy to see responding to the surrounding brightness. A result of the calculation is inputted to the Braun tube, then brightness is set (step 107), and an image is projected to the screen. If the apparatus is turned off (step 108), a termination process is performed (step 109), and if the apparatus is not turned off (step 108), the process is repeated from the step of detecting the brightness. surrounding is input to the control board R10 via the lead wire R13. The control board R10 calculates a minimum brightness values of the Braun tube R11 so that it is easy to see responding to the surrounding brightness. A result of the calculation is inputted to the Braun tube, then brightness is set, and an image is projected to the screen. If the apparatus is turned off, a termination process is performed, and if the apparatus is not turned off, the process is repeated from the step of detecting the brightness.

The multi-vision from the conventional example has performed the brightness control as described above. Since only information obtained from the sensor R3 is the brightness information, such that a brightness setting responding to a surrounding environment only at that instance is optimally set, and a control of the display color was not possible.

Also, the sensor R3 of the conventional multi-vision is not set for each one of the screens, therefore, even if there is a difference in the display colors between the screens, the conventional multi-vision is unable to detect the difference such that the color for every screen cannot be controlled, so the color is unevenly displayed as it is.

The present invention aims to adjust the display color of the display unit to a target color.

Also, the present invention aims to get rid of the differences in the display colors between the display units by adjusting the display colors of the plurality of display units of the multi-vision system to the same target color.

Further, the present invention aims to improve the performance of the whole color adjustment by optimally selecting a target color which is a measure to the display color adjustment for a plurality of the display units of the multi-vision system.

Furthermore, the present invention aims to perform the above-mentioned color calibration automatically eliminating too much manual operations with a simply configured unit.

DISCLOSURE OF THE INVENTION

According to one aspect of the present invention, a multi-vision system including a plurality of display units comprises the following: a sensor for performing colorimetry of display colors from the plurality of display units; a color conversion coefficient calculation unit for calculating a color conversion coefficient to calibrate a display color of each display unit by using colorimetry values obtained from the sensor by performing the colorimetry for the display colors of the plurality of display units; and a color processing unit for performing a color conversion of the display color of each display unit by using a calculated color conversion coefficient from the color conversion coefficient calculation unit.

According to another aspect of the present invention, the multi-vision system includes the following: the color processing unit which receives a signal of at least one of representing colors, and displays the representing color on the display units without a color conversion; the sensor perform colorimetry for the representing color of the plurality of display units displayed by the color processing unit; and the color conversion coefficient calculation unit calculates the color conversion coefficient of each display unit for color converting the representing color measured by the sensor to a pre-determined target color, and outputs a calculated color conversion coefficient to the color processing unit.

According to another aspect of the present invention, the multi-vision system includes the sensor which is positioned inside the multi-vision system and in between non-display area of the plurality of display units.

According to another aspect of the present invention, the multi-vision system includes the sensor which is positioned outside of the multi-vision system.

According to another aspect of the present invention, the multi-vision system includes the sensor which is placed to be able to scan in parallel against the plurality of display units.

According to another aspect of the present invention, the multi-vision system includes the color conversion coefficient calculation unit which decides a signal value of at least one of the representing colors, and takes a colorimetry value that has a maximum common color reproduction region in a color reproduction region of the plurality of display units as the target color of the representing color from within the colorimetry values of the representing color when displaying the representing color to the plurality of display units without a color conversion.

According to another aspect of the present invention, the multi-vision system includes the color conversion coefficient calculation unit which displays the colorimetry value of at least one of the representing colors of the plurality of display units on a chromaticity coordinate, and decides the target color based on a specified chromaticity coordinate.

According to another aspect of the present invention, the multi-vision system includes the color conversion coefficient calculation unit which decides a signal value of at least one of the representing colors, and takes a colorimetry value that has a smallest chroma as the target color of the representing color from within the colorimetry values of the representing color when displaying the representing color to the plurality of display units without a color conversion.

According to another aspect of the present invention, the multi-vision system includes the color conversion coefficient calculation unit which decides a signal value of at least one of the representing colors, and, as the target color of the representing color, takes an average value of the colorimetry values of the representing color when displaying the representing color to the plurality of display units without a color conversion.

According to another aspect of the present invention, the multi-vision system comprises a memory for storing a chromaticity value of the target color and a colorimetry value of each display unit. The multi-vision system includes the color conversion coefficient calculation unit which compares a chromaticity value obtained in a next calibration with one of the chromaticity value of the target color and a colorimetry value of a previous calibration, and the color conversion coefficient is calculated when there is a certain amount of difference between compared values.

According to another aspect of the present invention, the multi-vision system comprises a memory for storing the chromaticity value of the target color and a colorimetry value of each display unit. The multi-vision system includes the color conversion coefficient calculation unit which compares the chromaticity value obtained in the next calibration with one of the previous colorimetry value and the chromaticity value of the target color, selects a display unit that has a certain amount of difference between the compared values, and calculates the color conversion coefficient of a selected display unit.

According to another aspect of the present invention, a display unit, for displaying color by a mixture of primary colors comprises the following: a sensor for performing colorimetry of a display color of the display unit; a color conversion coefficient calculation unit for calculating color conversion coefficients to calibrate the display color of the display unit by using the colorimetry value obtained from the sensor by performing colorimetry for the display color of the display unit; and a color processing unit for performing a color conversion of the display color of the display unit by using a calculated color conversion coefficient from the color conversion coefficient calculation unit. The display unit includes the following: the color processing unit which receives a signal of at least one of the representing colors, and displays representing color on the display unit without a color conversion; the sensor which performs colorimetry for the representing color on the display unit displayed by the color processing unit; and the color conversion coefficient calculation unit which calculates the color conversion coefficients of the display unit for color converting the representing color measured by the sensor to a predetermined target color, and outputs calculated color conversion coefficients to the color processing unit.

According to another aspect of the present invention, the display unit includes the color conversion coefficient calculation unit which calculates the color conversion coefficients by using a 3-dimensional space.

According to another aspect of the present invention, the display unit includes the color conversion coefficient calculation unit which calculates the color conversion coefficients by using XYZ tristimulus values of an obtained color from the mixture of three primary colors in an additive mixture of color stimuli model.

According to another aspect of the present invention, a color calibration method of the multi-vision system including a plurality of display units comprises the following steps: a sensor step for performing colorimetry of display colors from the plurality of display units; a color conversion coefficient calculating step for calculating color conversion coefficients to calibrate a display color of each display unit by using colorimetry values obtained from the sensor by performing the colorimetry for the display colors of the plurality of display units measured by the sensor step; and a color processing step for performing a color conversion of the display color of each display unit by using calculated color conversion coefficients from the color conversion coefficient calculating step.

According to another aspect of the present invention, the color calibration method of the mutli-vision system comprises the following steps: the color processing step which includes a step of receiving a signal of at least one of the representing colors, and a step of displaying the representing color on the display units without a color conversion; the sensor step which includes a step of performing colorimetry for the representing color of the plurality of display units displayed by the color processing step; and the color conversion coefficient calculating step which includes a step of calculating the color conversion coefficients of each display unit for color converting the representing color measured by the sensor to a pre-determined target color, and a step of outputting a calculated color conversion coefficient to the color processing step.

BEST MODE FOR CARRYING OUT THE INVENTION

EMBODIMENT 1

Embodiment 1 of the present invention is described below with reference to the drawings.

Figure 1:
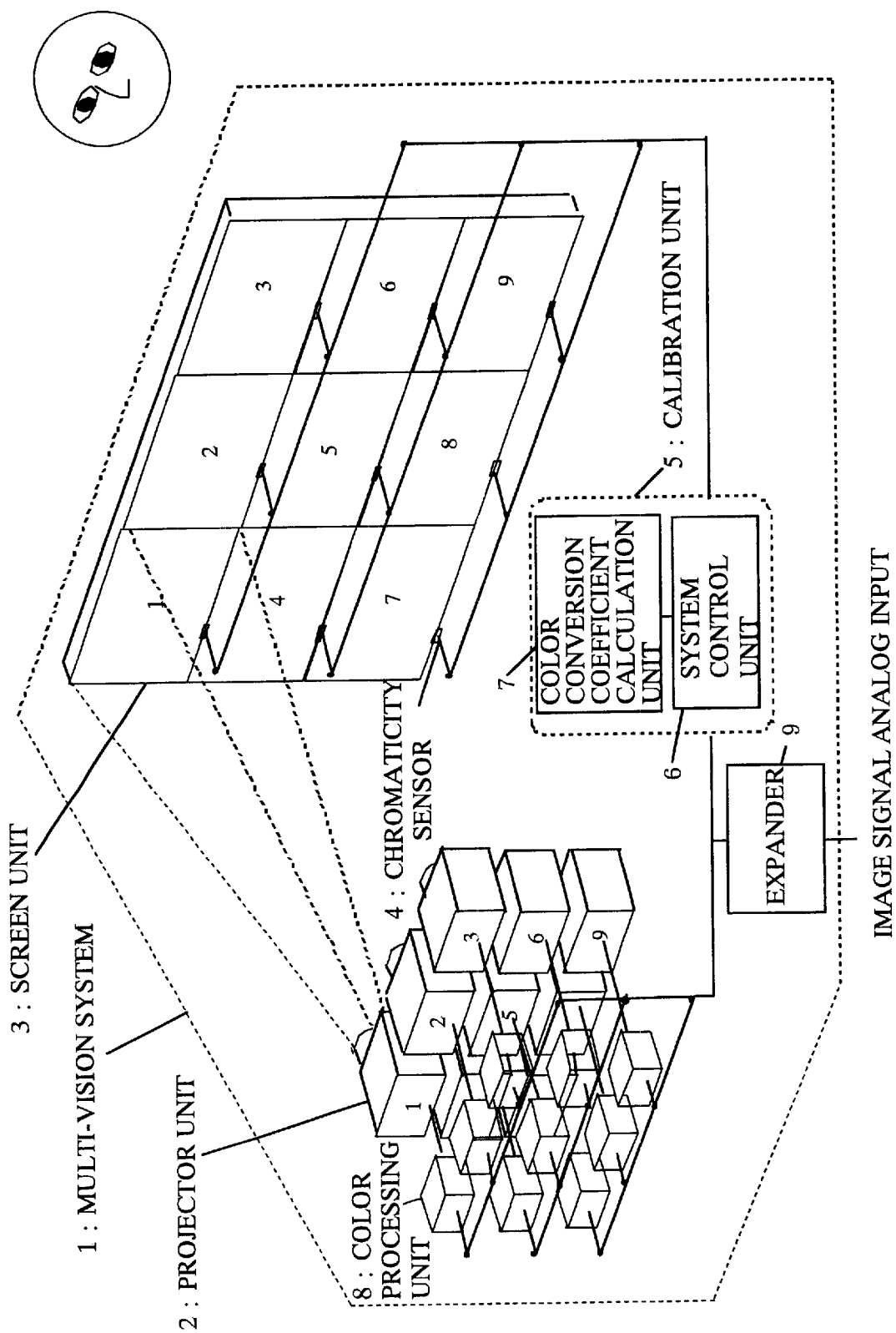
FIG. 1 is the whole block chart for embodiment 1 of the present invention.

FIG. 1 shows the whole block chart of the multi-vision system comprising a color calibration function as one of the embodiments in the present invention.

With reference to FIG. 1, the numbered components will be described: an outline 1 of the multi-vision system; projector units 2; and screen units 3. Note that each one of the projector units 2 corresponds with one of the screen units 3. An analog image signal inputted to an expander 9 is enlarged and divided, and image signals are generated for every one of the projector units 2. The image signals are inputted to the projector units 2 via color processing units 8.

Also, chromaticity sensors 4 are set between the screen units 3. The chromaticity sensors 4 are positioned so as to be able to perform colorimetry of corresponding projector units 2 for the color of the light source without color conversion by the color processing unit 8. A calibration unit 5 is configured from a color conversion coefficient calculation unit 7 and a system control unit 6. The system control unit 6 controls a series of color calibration processing by the projector units 2, the chromaticity sensors 4, the color conversion coefficient calculation unit 7, and the color processing units 8. The color conversion coefficient calculation unit 7 decides a target color from XYZ tristimulus values of the light source of each projector unit 2, the XYZ tristimulus values are obtained at the chromaticity sensor 4. The color conversion coefficient calculation unit 7 calculates a color conversion coefficient used for identifying the colors of the light source to the target color for each one of the projector units 2. The calculated color conversion coefficients are stored at the color processing units 8, which are corresponding to the projector units 2, one-by-one. From hereinafter, one projector unit 2 and one screen unit 3 are taken as a set, and this set concept is taken as a display.

Following is a detailed description of the embodiment 1 for the present invention.

First, an outline of the color conversion for the multi-vision system at the color processing unit 8 is described, and this is followed by an outline on how to calculate the color conversion coefficients at the color conversion coefficient calculation unit 7. For the display unit being applied to an additive mixture of color stimuli model, equation 1 is applicable. The equation 1 shows that a color space of the display taking the additive mixture of color stimuli is a linear space. The equation 1 shows that the XYZ tristimulus values of $X_c$, $Y_c$, $Z_c$ of a color C, which is a mixture of the three primary colors R (red), G (green) and B (blue), is expressed in linear addition of the XYZ tristimulus values for each one of the three primary colors R, G and B. The tristimulus values of a primary color R are expressed as $X_r$, $Y_r$, $Z_r$, the tristimulus values of a primary color G are expressed as $X_r$, $Y_r$, $Z_r$, and the tristimulus values of a primary color B are expressed as $X_b$, $Y_b$, $Z_b$.

$$\begin{pmatrix} X_c \\ Y_c \\ Z_c \end{pmatrix} = \begin{pmatrix} X_r & X_g & X_b \\ Y_r & Y_g & Y_b \\ Z_r & Z_g & Z_b \end{pmatrix} \begin{pmatrix} \alpha \\ \beta \\ \gamma \end{pmatrix} \quad \text{Equation 1}$$

In this equation, $\alpha$, $\beta$, and $\gamma$ are scalar quantities showing an intensity of light, and these can be expressed as shown in equation 2. In the equation 2, $R_d$, $G_d$, and $B_d$ are digital input signals of R, G and B. In the equation 2, $f_r$, $f_g$, $f_b$, are functions that calculate the scalar quantities $\alpha$, $\beta$, and $\gamma$ from the digital input signals of R, G and B. The scalar quantities $\alpha$, $\beta$, and $\gamma$ show the intensity of light (brightness), that is, the ratio of the maximum luminous brightness for the individual primary colors, values 0~1.

$$\alpha = f_r(R_d)$$
$$\beta = f_g(G_d)$$
$$\gamma = f_b(B_d) \quad \text{Equation 2}$$

When using the equations 1 and 2, and provided that the XYZ tristimulus values of the three primary colors R, G and B are known, the XYZ tristimulus values for the color C are calculated and obtained from the digital input signals ($R_d$, $G_d$, $B_d$) that display the color C.

The coefficients $\alpha$, $\beta$, and $\gamma$ are the ratio of the maximum luminous brightness for the individual primary colors, and these are values between 0 to 1. For cases of CRT (cathode ray tube) monitor or projector, $f_r$, $f_g$, $f_b$ are expressed in functions of higher order, however, for the purpose of simplicity, an optical device applicable in linear function is described hereinafter. Therefore, to normalize the input signals ranging, for instance, from digital values 0~255, the input signals are simply divided by 255 and the coefficients $\alpha$, $\beta$, and $\gamma$ are calculated this way. That is, $\alpha = R_d/255$, $\ominus = G_d/255$, and $\gamma = B_d/255$.

Now, n is indicating the nth display unit. n is attached to a matrix of the equation 1, and the equations 3, 4 and 5 are defined as follows.

$$C_n = \begin{pmatrix} X_{nc} \\ Y_{nc} \\ Z_{nc} \end{pmatrix} \quad \text{Equation 3}$$

The equation 3 defines a matrix expression of the XYZ tristimulus values for the color C of the nth display.

$$M_n = \begin{pmatrix} X_{nr} & X_{ng} & X_{nb} \\ Y_{nr} & Y_{ng} & Y_{nb} \\ Z_{nr} & Z_{ng} & Z_{nb} \end{pmatrix} \qquad \text{Equation 4}$$

The equation 4 defines a matrix expression of the XYZ tristimulus values for the three primary colors R, G and B of the nth display.

$$D_n = \begin{pmatrix} \alpha_n \\ \beta_n \\ \gamma_n \end{pmatrix} \qquad \text{Equation 5}$$

The equation 5 defines a matrix expression for the ratio of the maximum luminous brightness (scalar quantities showing the intensity of light) for the individual primary colors of the nth display.

When defined as mentioned above, the tristimulus values of the color C, for the nth display unit is expressed as shown in equation 6.

The equation 6 is the equation 1 which are being expressed by using the matrix expressions of the equations 3, 4 and 5. For equation 6 (and from hereinafter), the symbol "·" denotes a multiplication of the matrices.

$$C_n = M_n \cdot D_n \qquad \text{Equation 6}$$

As can be seen from the equation 6, $M_n$ represents a conversion matrix, from the digital values of the input signals for R, G and B, to the XYZ tristimulus values of the color. Even if the input signals are equal, when the displayed color is different depending on a display unit, this matrix $M_n$ will be respective of each display unit.

The color value $C_n$ expressed in the equation 6 is actually different for every display unit. Therefore, the color value $C_n$ needs to be approximately equal to a final display color by taking a correction of the signal value input to the projector unit, that is, the XYZ tristimulus values need to be approximately equal. To do this, the color conversion is performed at the color processing unit 8, by multiplying the input signal by the color conversion coefficient $M_{nt}$, to give a color output of a common color reproduction region as shown in equation 7. The equation 7 multiplies the ratio for the maximum luminous brightness ratio (scalar quantities showing the intensity of light) for the individual primary colors by the color conversion coefficient $M_{nt}$, for converting to a color of the common color reproduction region (a target color). Now, XYZ tristimulus values of the common color reproduction region are expressed in $C_t$.

$$C_t = M_n M_{nt} \cdot D_n \qquad \text{Equation 7}$$

In the color calibration of the present invention, the color conversion coefficient $M_{nt}$ is obtained and stored in the color processing unit 8.

So, $M_{nt}$ can easily be calculated for the three primary colors R, G and B using the equation 7. When $D_n'$ is the ratio of the maximum luminous brightness of separately displayed three primary colors R, G and B, the $D_n'$ is expressed in a unit matrix as shown in equation 8.

$$D_n' = \begin{pmatrix} f_r(R_r) & f_r(R_g) & f_r(R_b) \\ f_g(Gr) & f_g(G_g) & f_g(G_b) \\ f_b(Br) & f_b(B_g) & f_b(B_b) \end{pmatrix} = \begin{pmatrix} 1 & 0 & 0 \\ 0 & 1 & 0 \\ 0 & 0 & 1 \end{pmatrix} \qquad \text{Equation 8}$$

The equation 8 is an expanded equation of the equation 5 showing the ratio of the maximum luminous brightness for the three primary colors R, G and B that are separately displayed.

$f_r(R_r)$ $f_g(G_r)$, $f_b(B_r)$ is the ratio of the maximum luminous brightness for the displayed primary color R. $f_r(_g)$, $f_g(G_g)$, $f_b(B_g)$ is the ratio of the maximum luminous brightness for the displayed primary color G. $f_r(Rb)$, $f_g(G_b)$, $f_b(B_b)$ is the ratio of the maximum luminous brightness for the displayed primary color B. Using the equation 8, that is, using the case that the $D_n'$ is an unit matrix, the XYZ tristimulus values of the common color reproduction region $C_t$ in the equation 7 is expressed as below in equation 9.

$$C_t = \begin{pmatrix} X_{tr} & X_{tg} & X_{tb} \\ Y_{tr} & Y_{tg} & Y_{tb} \\ Z_{tr} & Z_{tg} & Z_{tb} \end{pmatrix} = M_n \cdot M_{nt} \cdot D_n' \qquad \text{Equation 9}$$

$$= M_n \cdot M_{nt} \cdot \begin{pmatrix} 1 & 0 & 0 \\ 0 & 1 & 0 \\ 0 & 0 & 1 \end{pmatrix} = M_n \cdot M_{nt}$$

The equation 9 is the expanded equation of the equation 7 for a case when the three primary colors R, G and B are separately displayed, as in the case of the equation 8. Equation 10 is for calculating $M_{nt}$ which needs to be calculated in the end. Equation 10 is given by transforming the equation 9.

$$M_{nt} = M_n^{-1} \cdot C_t \qquad \text{Equation 10}$$

The equation in the equation 10 shows an inverse matrix of $M_n$.

The equation 10 calculates the color conversion coefficient $M_{nt}$ which needs to be calculated in the end.

For a case of not using a maximum luminous brightness for individual primary colors, $D_n$ cannot be expressed in the unit matrix, therefore, each element value in the equation 8 must be specifically calculated. In this case, the equation 10 turns out to be $M_{nt} = M_n^{-1} \cdot C_t \cdot D_n'^{-1}$. Here, "$D_n'^{-1}$" is the inverse matrix of the matrix $D_n'$.

As described above, the color calibration in the present system is to obtain the color conversion coefficients $M_{nt}$ in the color processing unit. Following below, a method of the color calibration executed by the system control unit 6 will be described with reference to FIGS. 2 and 3.

In normal image display, the color conversion is performed at the color processing unit 8. However, for color calibration, the image is displayed without performing the color conversion, therefore, the system control unit 6 sets no color conversion mode to each color processing unit 8 (S10).

Referring now to the colorimetry, for example, black (BK) is displayed first on the screen, and the primary colors R, G and B are displayed in this order. Here, the reason for displaying black (BK) is because a black drifting phenomena must be taken into account, and there is no need to display black (BK) if there is no need to take account of the black drifting phenomena.

The input signal values ($R_d$, $G_d$, $B_d$) for all the colors are;

BK: (0, 0, 0)

R: (255, 0, 0)

G: (0, 255, 0)

B: (0, 0, 255)

First, black (BK) is displayed to the display units all at the same time, and all of XYZ tristimulus values obtained from the chromaticity sensors 4 of the display units are transferred to the color conversion coefficient calculation unit 7. In the color conversion coefficient calculation unit 7, a plurality of XYZ tristimulus values from a several number of measurements by the sensors are stored, and after completing the measurements for m times, an average value of XYZ tristimulus values for each one of the display units is calculated for every display units (S11~S15). The calculated value is used when taking into account the black drifting phenomena which will be described later. Likewise, the above-mentioned processing are performed to all of the primary colors R, G and B (S21~S25, S31~S35, S41~S45), and $M_n$ are calculated for R, G and B using the equation 4. The calculated $M_n$ are used in the equation 10 to calculate the color conversion coefficients $M_{nr}$.

Next, the target color is set at the color conversion coefficient calculation unit 7 (S50). At this time, as a method of setting the target color from all the colorimetry values, for each one of the representing colors (in this example the primary colors), the XYZ tristimulus values with a smallest chroma is set as XYZ tristimulus values of the target color $C_t$. The method of deciding the colorimetry value with the smallest chroma is to measure the distances between the points and the achromatic axis which is expressed in a straight line, in a 3-dimensional XYZ space, and the point with a shortest distance is selected as the colorimetry value.

Since the processing in the 3-dimensional space is complex, therefore, as described below, the processing can be made easy by a projection to a 2-dimensional plane. However, this is only a close resemblance. The projection into the 2-dimensional plane, for example, is expressed by converting to x, y chromaticity coordinate shown in the equation 11. For example, provided that the XYZ tristimulus values of the representing color (primary color) R for the display unit n is expressed in ($X_{nr}$, $Y_{nr}$, $Z_{nr}$), when this value is expressed in the chromaticity coordinate ($X_{nr}$, $Y_{nr}$, $Z_{nr}$), the result is shown below in equation 11.

$$x_{nr} = X_{nr}/(X_{nr}+Y_{nr}+Z_{nr})$$

$$y_{nr} = Y_{nr}/(X_{nr}+Y_{nr}+Z_{nr})$$

$$z_{nr} = 1 - x_{nr} - y_{nr} \qquad \text{Equation 11}$$

The equation 11 is said to be the projection into a unit plane of x+y+z=1. In this chromaticity coordinate system, the achromatic axis becomes one of the points, and expressed in 2 variables. When this achromatic point is expressed as ($x_0$, $y_0$) in the coordinate, the value with the smallest chroma in the colorimetry values is the colorimetry value with the shortest distance from the achromatic point. When expressed using an equation, a point in the chromaticity coordinate ($x_{nr}$, $y_{nr}$), having the minimum value calculated by equation 12, is taken as the chromaticity coordinate of the target color.

$$l = \sqrt{(x_{nr}-x_0)^2 + (y_{nr}-y_0)^2} \qquad \text{Equation 12}$$

However, at this point, the XYZ tristimulus values ($X_{tr}$, $Y_{tr}$, $Z_{tr}$) cannot be decided identically. So, Y value is chosen and set from the XYZ tristimulus values. As one of the methods of doing so, $Y_{nr}$ from the ($x_{nr}$, $y_{nr}$) of the display n, which is calculated to be the smallest one from the equation 12, is adopted as it is, and then values of $X_{nr}$, $Z_{nr}$ are calculated.

This process is similarly performed for the primary colors G and B, to obtain the XYZ tristimulus values ($X_{tg}$, $Y_{tg}$, $Z_{tg}$) and ($X_{tb}$, $Y_{tb}$, $Z_{tb}$) for the target colors of the two primary colors. These XYZ tristimulus values are difficult to display in the 3-dimensional space, therefore, for the purpose of simplicity, the result when displaying these in the 2-dimensional x, y chromaticity diagram is shown in FIG. 4.

Figure 4:
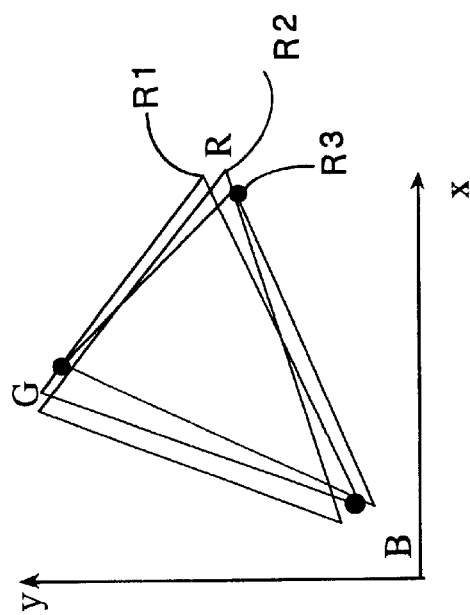
FIG. 4 illustrates target color decided by the color calibration for embodiment 1 of the present invention.
Figure 4:
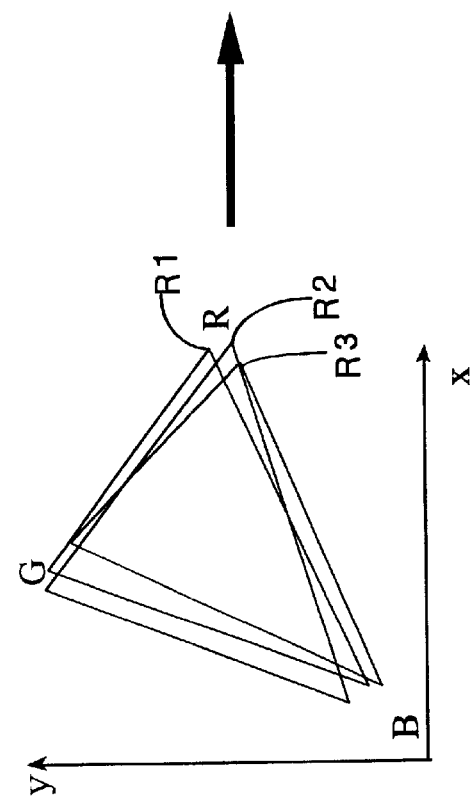

Also, for the purpose of simplicity, FIG. 4 illustrates an example using three display units, and a diagram on left shows the result of colorimetry, and the diagram on right shows the chromaticity coordinate of the decided target colors in black dots "●". For example, for the primary color R of the three display units, the black dot ● shows that R3 having the smallest chroma is chosen from the colorimetry values R1, R2 and R3 as the target color of the chromataicity coordinate.

Another method of setting the target color is available as described below. From the XYZ tristimulus values of the colorimetry result for all of the n number of the display units, an average value (i.e. center of gravity) for all the representing colors are calculated, and the calculated value is set as the XYZ tristimulus values of the target color. For example, provided that the XYZ tristimulus values of the representing color R for the display unit n is expressed in ($X_{nr}$, $Y_{nr}$, $Z_{nr}$), the XYZ tristimulus values of the target color for the primary color R ($X_{tr}$, $Y_{tr}$, $Z_{tr}$) is shown in equation 13.

$$X_{tr} = \left(\sum_{i=1}^{n} X_{ir}\right)/n \qquad \text{Equation 13}$$

$$Y_{tr} = \left(\sum_{i=1}^{n} Y_{ir}\right)/n$$

$$Z_{tr} = \left(\sum_{i=1}^{n} Z_{ir}\right)/n$$

The equation 13 calculates the average value (i.e. center of gravity) of all the XYZ tristimulus values of the representing color R for the display unit.

This calculation is similarly performed for the primary colors G and B, to calculate the XYZ tristimulus values for their target colors ($X_{tg}$, $Y_{tg}$, $Z_{tg}$) and ($X_{tb}$, $Y_{tb}$, $Z_{tb}$). These XYZ tristimulus values are difficult to display in the 3-dimensional space, therefore, for the purpose of simplicity, FIG. 5 shows the result of displaying these in the 2-dimensional x, y chromaticity diagram.

Figure 5:
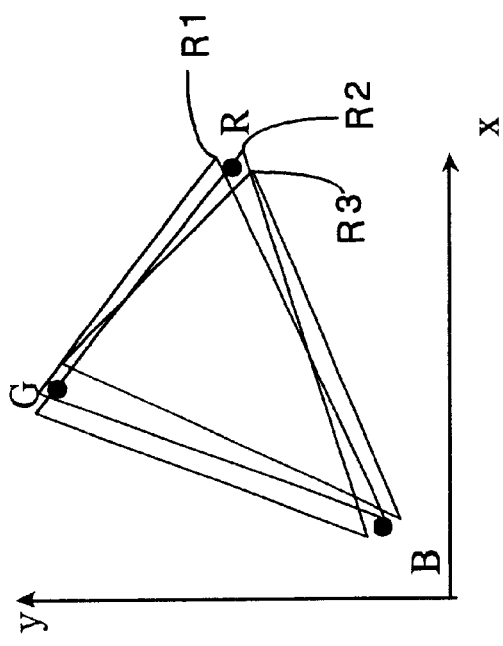
FIG. 5 illustrates the target color decided by the color calibration for embodiment 1 of the present invention.
Figure 5:
Figure 5:
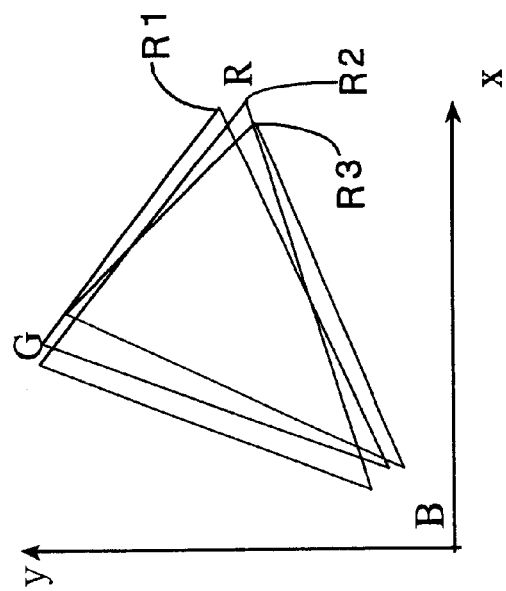

Similar to FIG. 4, for the purpose of simplicity, FIG. 5 illustrates an example of the three display units, for which the diagram on left shows the colorimetry result and the diagram on right shows the chromaticity coordinate of the decided target colors in black dots "●". For example, for the primary color R of the three display units, the black dot ● on R shows the average value (center of gravity) of the colorimetry values R1, R2 and R3.

When the tristimulus values $C_t$ of the target color for the primary colors R, G and B are decided, the color conversion coefficients $M_{nt}$ are calculated based on each projector unit (S51). In this step, the black drifting phenomena needs to be taken into account. The black drifting is a slight luminance shown due to a dark current even when the digital input signal R=G=B=0 is inputted, that is, even when black (BK) is being displayed.

Considering an effect of the black drifting, the equation 1 is expressed as equation 14.

$$\begin{pmatrix} X_c \\ Y_c \\ Z_c \end{pmatrix} = \begin{pmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{pmatrix} \begin{pmatrix} \alpha \\ \beta \\ \gamma \end{pmatrix} + \begin{pmatrix} X_k \\ Y_k \\ Z_k \end{pmatrix} \quad \text{Equation 14}$$

The equation 14 is the equation 1 which shows the XYZ tristimulus values of the color C when taking into account the effect of black drifting due to the dark current. That is, the XYZ tristimulus values $X_c$, $Y_c$, $Z_c$ of the color C which are the color obtained from a mixture of the three primary colors R, G and B, are linear addition of subtracted values of the XYZ tristimulus values $X_k$, $Y_k$, $Z_k$ of the dark current from the XYZ tristimulus values of the three primary colors. Here, as the scalar quantities which express the intensity of light, $\alpha$, $\beta$ and $\gamma$ are expressed as shown in equation 15. In the equation 15, $R_d$, $G_d$, $B_d$ are the digital input signals of R, G and B in 8 bits. $Y(R_d)$, $Y(G_d)$, $Y(B_d)$ are the luminous brightness for individual primary colors when taken into account the effect of the black drifting by the dark current. $Y_k$ is the luminous brightness by the dark current when displaying black (BK). $Y_r$, $Y_g$, $Y_b$ are the maximum luminous brightness for individual primary colors. The equation 15 supposes that the optical device having the functions $f_r$, $f_g$, $f_b$ of the equation 2 being expressed in the linear function.

$$\alpha = (Y(R_d) - Y_k)/(Y_r - Y_k) = R_d/255$$

$$\beta = (Y(G_d) - Y_k)/(Y_g - Y_k) = G_d/255$$

$$\gamma = (Y(B_d) - Y_k)/(Y_b - Y_k) = B_d/255 \quad \text{Equation 15}$$

As described previously, if the luminous brightness $Y(R_d)$, $Y(G_d)$, $Y(B_d)$ of the individual primary colors that has taken into account the effect of the black drifting due to the dark current supposes the optical device that can use the functions $f_r$, $f_g$, $f_b$ using the linear function as in the equation 2, then the $Y(R_d)$, $Y(G_d)$, $Y(B_d)$ are expressed by equation 16.

$$\begin{pmatrix} Y(R_d) \\ Y(G_d) \\ Y(B_d) \end{pmatrix} = \begin{pmatrix} (Y_r - Y_k) \cdot R_d / 255 \\ (Y_g - Y_k) \cdot G_d / 255 \\ (Y_b - Y_k) \cdot B_d / 255 \end{pmatrix} + \begin{pmatrix} Y_k \\ Y_k \\ Y_k \end{pmatrix} \quad \text{Equation 16}$$

The equation 16 is for calculating the luminous brightness $Y(R_d)$, $Y(G_d)$, $Y(B_d)$ of the individual primary colors when the effect of the black drifting due to the dark current is taken into account. Therefore, the equation 15 calculates the scalar quantities $\alpha$, $\beta$ and $\gamma$ (the ratio of the maximum luminous brightness of the individual primary colors) which express the intensity of light from the digital input signals of R, G and B when the luminous brightness $Y(R_d)$, $Y(G_d)$, $Y(B_d)$ of the individual primary colors calculated from the equation 16 are used upon taking into account the effect of the black drifting due to the dark current. In case of normal CRT monitor or projector, the equation 15 is expressed as equation 17.

$$\alpha = (f_r(R_d) - Y_k)/(Y_r - Y_k)$$

$$\beta = (f_g(G_d) - Y_k)/(Y_g - Y_k)$$

$$\gamma = (f_b(B_d) - Y_k)/(Yb - Y_k) \quad \text{Equation 17}$$

The equation 17 express the scalar quantities $\alpha$, $\beta$ and $\gamma$ (the ratio of the maximum luminous brightness for the individual primary colors) which shows the intensity of light for the case of the CRT monitor or the projector when the luminous brightness cannot be calculated using the linear function.

The equations 15, 16 and 17 are for describing $\alpha$, $\beta$ and $\gamma$ in the equation 14. In case of considering the black drifting effect also, when the $\alpha$, $\beta$ and $\gamma$ are expressed in the equation 15, as mentioned after the equation 2, "to normalize the input signals ranging from digital values 0~255, the input signals are simply divided by 255 and the coefficients $\alpha$, $\beta$ and $\gamma$ are calculated". In this way, the equation 10 is reached via the equations 8 and 9.

When taking into account the effect of the black drifting due to the dark current, the color conversion coefficient $M_{nt}$ is obtained using the equation 10, $M_{nt} = M_n^{-1} \cdot C_t$. The conversion matrix $M_n$ is defined in equation 18. The XYZ tristimulus values of the target color $C_t$ is defined in equation 19.

$$M_n = \begin{pmatrix} X_{nr} - X_{nk} & X_{ng} - X_{nk} & X_{nb} - X_{nk} \\ Y_{nr} - Y_{nk} & Y_{ng} - Y_{nk} & Y_{nb} - Y_{nk} \\ Z_{nr} - Z_{nk} & Z_{ng} - Z_{nk} & Z_{nb} - Z_{nk} \end{pmatrix} \quad \text{Equation 18}$$

$$C_t = \begin{pmatrix} X_{tr} - X_{tk} & X_{tg} - X_{tk} & X_{tb} - X_{tk} \\ Y_{tr} - Y_{tk} & Y_{tg} - Y_{tk} & Y_{tb} - Y_{tk} \\ Z_{tr} - Z_{tk} & Z_{tg} - Z_{tk} & Z_{tb} - Z_{tk} \end{pmatrix} \quad \text{Equation 19}$$

The equation 18 defines the equation 4 that takes into account the effect of black drifting due to the dark current, that is, it defines the matrix expression of the XYZ tristimulus values of the three primary colors R, G and B of the nth display. $X_{nk}$, $Y_{nk}$, $Z_{nk}$ of the equation 18 are the XYZ tristimulus values for the case of displaying black (BK) to the nth display. The equation 19 defines the equation 9 that takes into account the effect of black drifting due to the dark current, that is, it defines the matrix expression of the XYZ tristimulus values of the three primary colors R, G and B. $X_{tk}$, $Y_{tk}$, $Z_{tk}$ of the equation 19 is the XYZ tristimulus values of black of the target color.

Here, as for the XYZ tristimulus values ($X_{tk}$, $Y_{tk}$, $Z_{tk}$) of black of the target color, from the XYZ tristimulus values ($X_{nk}$, $Y_{nk}$, $Z_{nk}$) of the target color black for each display unit, the XYZ tristimulus values with a largest $Y_{nk}$ is selected.

When $D_n'$ cannot be expressed in the unit matrix, the equation 9 becomes $C_t = M_n \cdot M_{nt} \cdot D_n'$, therefore, the equation 10 becomes $M_{nt} = M_n^{-1} \cdot C_t \cdot D_n'^{-1}$ is the inverse matrix of the matrix $D_n$.

The calculated color conversion coefficient $M_{nt}$ of the display unit is stored in the color processing unit 8 (S52), and a test image is displayed (S53) and then the color calibration mode is completed.

According to the present embodiment, in aiming for the target color of the representing colors for all of the display units, the color calibration is executed. Also, in the present embodiment, by performing colorimetry of the displaying color from the plurality of display units, the target color is automatically calculated.

Also, according to the present embodiment, the multivision system installs the chromaticity sensors for performing colorimetry of the plurality of display units, places the chromaticity sensors at the non-display area which is in between the plurality of the display units, and performs colorimetry of the light directly from the light source, therefore, the system enables to achieve the color calibration device without making the device too large in scale.

Further, according to the present embodiment, the colorimetry value with the smallest chroma from the colorimetry values in the plurality of display units is chosen as the target color of the representing color, the target color is automatically set, a strict color calibration is automatically performed from a viewpoint of the chroma, therefore, problem of narrowing down of the color reproduction region when just seeking for the common color reproduction region is solved.

Furthermore, according to the present embodiment, the average value of the colorimetry values from the plurality of display units is taken as the target color for the representing color, so that the target color is automatically set for automatic color calibration, therefore, problem of narrowing down of the color reproduction region when just seeking for the common color reproduction region is solved.

Furthermore, according to the present embodiment, when a target color is set beforehand, this embodiment can be applied to the color calibration having a single display unit. In case that the color calibration is performed for the single display unit, the example is characterized by the color conversion coefficient calculation unit 7 which calculates the color conversion coefficient using the 3-dimensional space. That is, the example is characterized in calculating the color conversion coefficient using the XYZ tristimulus values for the color obtained by mixing the three primary colors based on the additive mixture of color stimuli model.

EMBODIMENT 2

Embodiment 2 of the present invention will be described with reference to the drawing.

Figure 6:
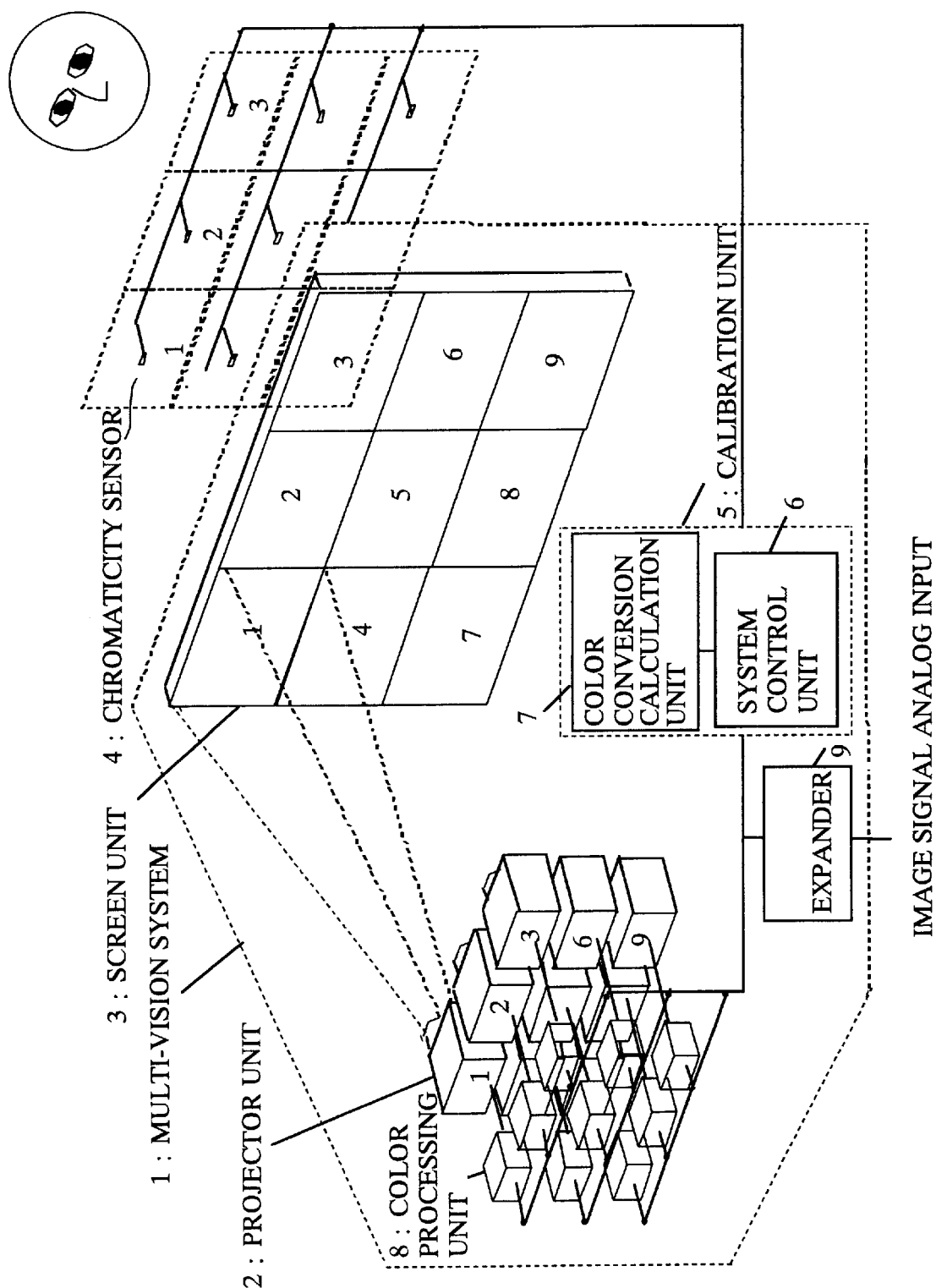
FIG. 6 is the whole block chart for embodiment 2 of the present invention.

FIG. 6 is the whole block chart of the multi-vision system provided with the color calibration function, showing one of the embodiments in the present invention.

The characteristic of embodiment 2 being different from embodiment 1 is that the positions of the chromaticity sensors 4 are outside of the multi-vision system, as illustrated in FIG. 6. Unlike embodiment 1, the sensor of the embodiment 2 does not perform colorimetry of the light source, but it performs colorimetry for the colors of the screen unit 3. Also, the sensor in embodiment 1 is measuring a light leaking to outside of the screen, however, in the system of embodiment 2, a color at the screen center is measured by the sensor. The method of calibration is same as embodiment 1.

According to the present embodiment, since the chromaticity sensors, which perform colorimetry of the plurality of the display units, are placed outside of the multi-vision system, therefore, the sensors does not perform colorimetry for the light from the light source, but perform colorimetry for the display colors of the display units. And further, the positions where the colorimetry should take place can be set to the central parts of the display units, for this reason, an accurate colorimetry which further leads to an accurate color calibration becomes possible.

EMBODIMENT 3

Embodiment 3 of the present invention will be described with reference to the drawings.

Figure 7:
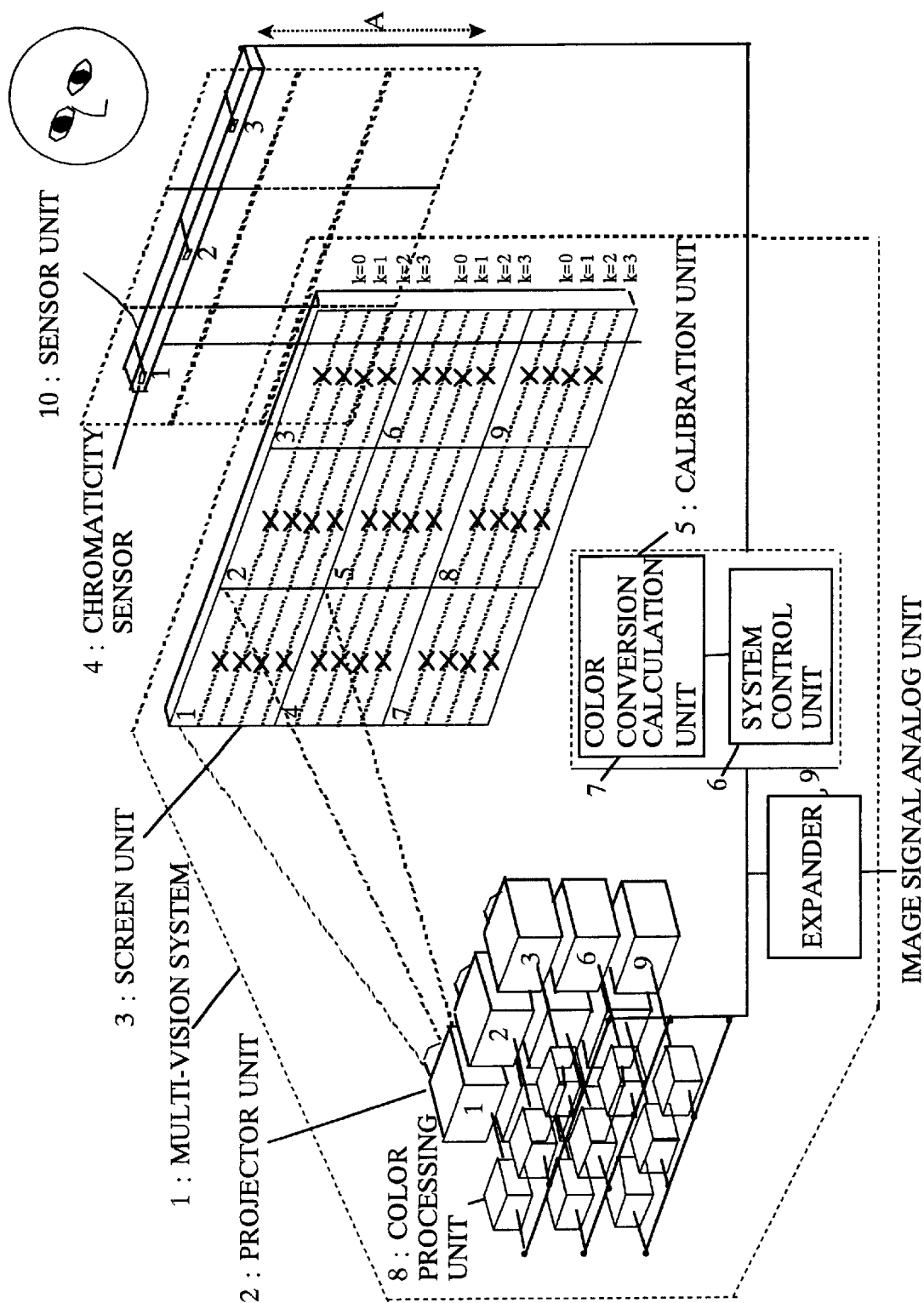
FIG. 7 is the whole block chart for embodiment 3 of the present invention.

FIG. 7 is the whole block chart of the multi-vision system provided with the color calibration function, showing one of the embodiments in the present invention.

The characteristic of embodiment 3 being different from embodiment 1 is that a smaller number of chromaticity sensors 4 than the number of display units are placed outside of the multi-vision system, as illustrated in FIG. 7. These chromaticity sensors 4 are arranged in a line on top a sensor unit 10. The number of chromaticity sensors 4 in the sensor unit 10 are same as the number of the display units that are aligned horizontally in one line. As illustrated in FIG. 7, the sensor unit 10 is provided with a mechanism that scans in parallel to multi-vision, which is a direction A (the mechanism not illustrated). While the sensor unit 10 scans the multi-vision in up and down directions, the sensor unit 10 performs colorimetry at a plurality of points for each screen unit. The colorimetry points in each screen unit 3 are shown in "x" in FIG. 7.

Figure 8:
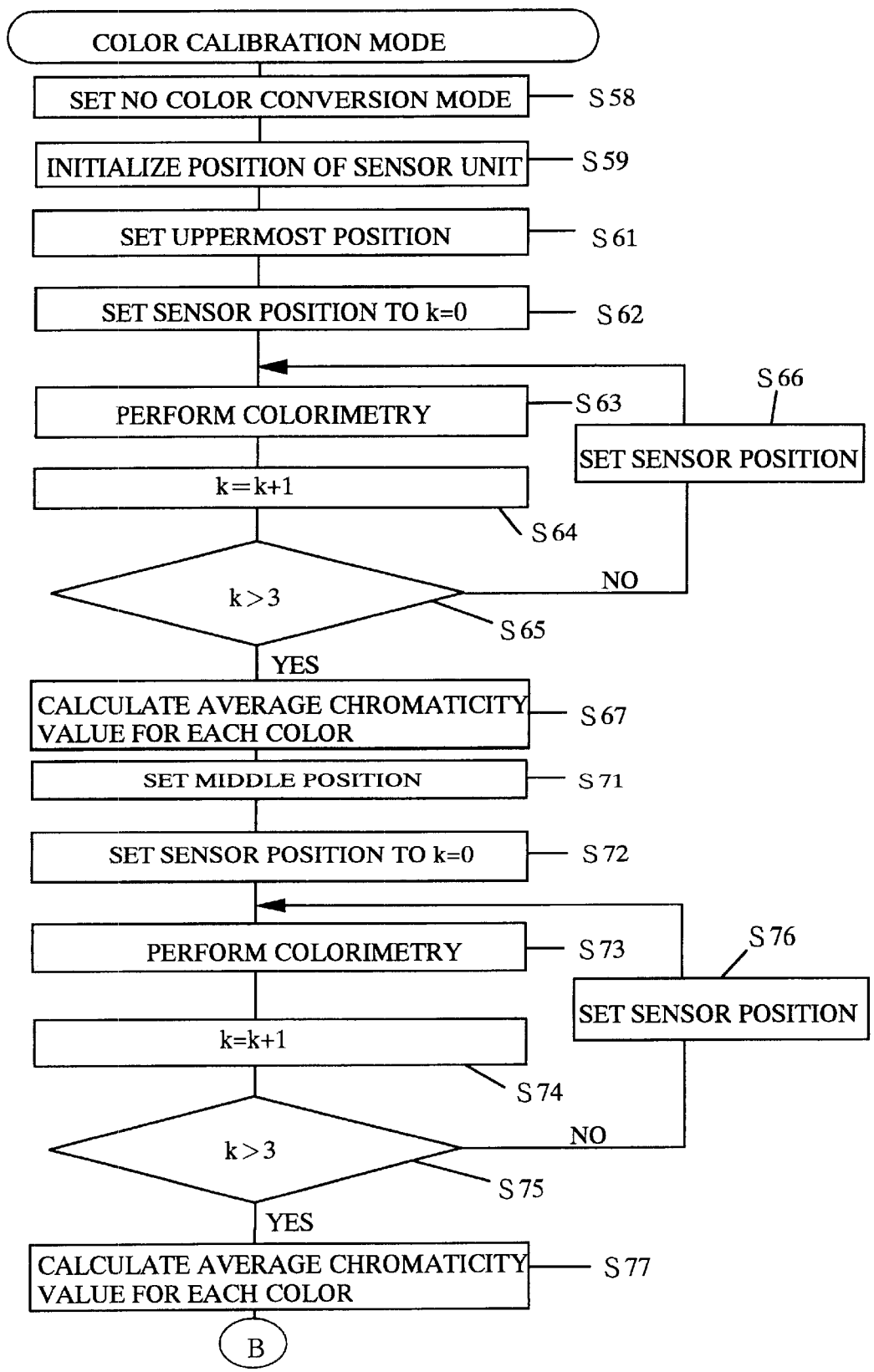
FIG. 8 is the flow chart of the color calibration process for embodiment 3 of the present invention.
Figure 9:
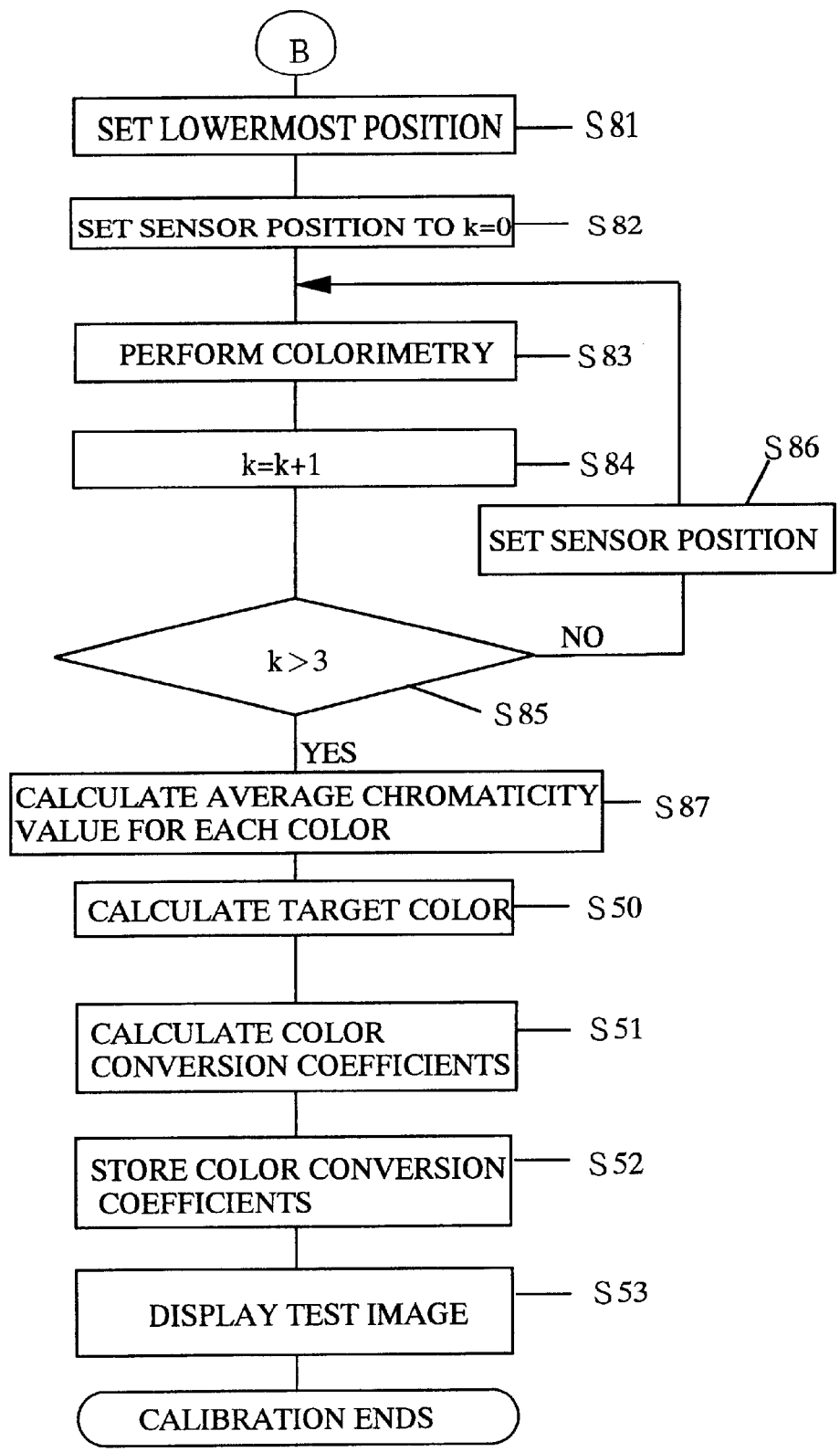
FIG. 9 is the flow chart of the color calibration process for embodiment 3 of the present invention.

An operation of the system control unit 6 will be described below with reference to the flow charts of FIGS. 8 and 9.

After setting the no color conversion mode to each color processing unit (S58), a position of the sensor unit 10 is initialized (S59). To begin with, colorimetry are to be performed for the No.1, No.2 and No.3 screen units 3 so the sensor unit is set to an uppermost position (S61). Next, the sensor unit 10 is moved and positioned to the line of a first colorimetry point K=0 (S62). The colorimetry is performed as described in embodiment 1, in the order of BK, R, G andB, and after the image signal of each color is inputted, the XYZ tristimulus values are loaded by the chromaticity sensor 4. Accordingly, when the first colorimetry is finished, the sensor unit 10 is again moved and positioned to a next line K=1 and the colorimetry is performed. These processes are repeated to a line K=3 (S63~S66). In simplifying the drawing, the figure illustrates four colorimetry points for each screen unit 3, however, the points can be more or less than this. When the colorimetry for the uppermost level of the screen units 3 completes as described, the average value is calculated from the XYZ tristimulus values of the representing color for each screen unit 3 (S67). Same processing are done at middle and lowermost levels, and then the colorimetry for all screen units 3 are completed (S71~S77, S81~S87). All the processing afterwards such as calculation of the target color and calculation of the color conversion coefficient are same as in embodiment 1 (S50~S53).

According to the present embodiment, the chromaticity sensors for performing colorimetry of the colors of the plurality of display units are aligned in the sensor unit outside the multi-vision system, and the sensor unit scans the multi-vision in parallel to perform colorimetry of the display colors for all the display units, therefore, colorimetry of all display units using a less number of chromaticity sensors becomes possible.

In embodiment 3, the scanning direction by the sensors illustrated is only 1-dimensional in the direction of A, however, 2-dimensional scanning can also be performed by installing the scanning mechanism in parallel to the multi-vision and in a direction 90 degrees to the direction A.

Also, in embodiment 3, the colorimetry values of all colorimetry points are being averaged out. However, a position of the colorimetry point is freely decided in the screen unit, and the one point only may be used as the colorimetry value. Or instead, an averaged value of the plurality of the arbitrary colorimetry points may be used.

EMBODIMENT 4.

Embodiment 4 of the present invention is described with reference to the drawings.

Figure 10:
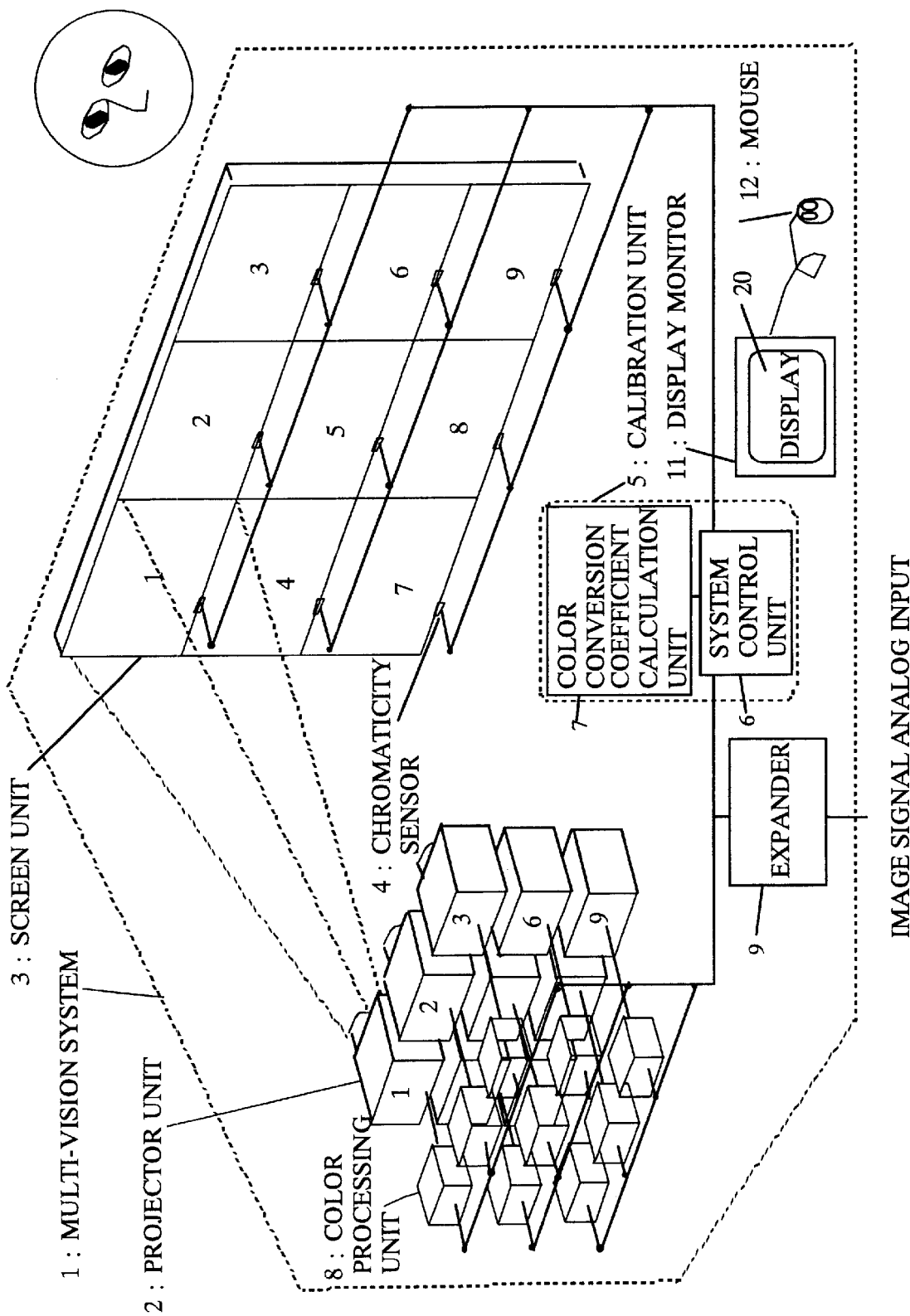
FIG. 10 is the whole block chart for embodiment 4 of the present invention.

FIG. 10 is the whole block chart of the multi-vision system provided with the color calibration function, showing one of the embodiments in the present invention.

The characteristic of embodiment 4 being different from embodiment 1 is, that the colorimetry values (XYZ tristimulus values) of the primary colors BK, R, G and B for each screen unit 3 are displayed in 3-dimensional coordinates 20 of a display monitor 11 connected to the system control unit 6 upon setting the target colors, as illustrated in FIG. 10 An operator can recognize colorimetry results for each screen unit 3 from the display monitor 11, and the operator can set the target color of each primary color using a pointing device such as mouse 12.

A method of setting the target color is described with reference to FIG. 11.

Figure 11:
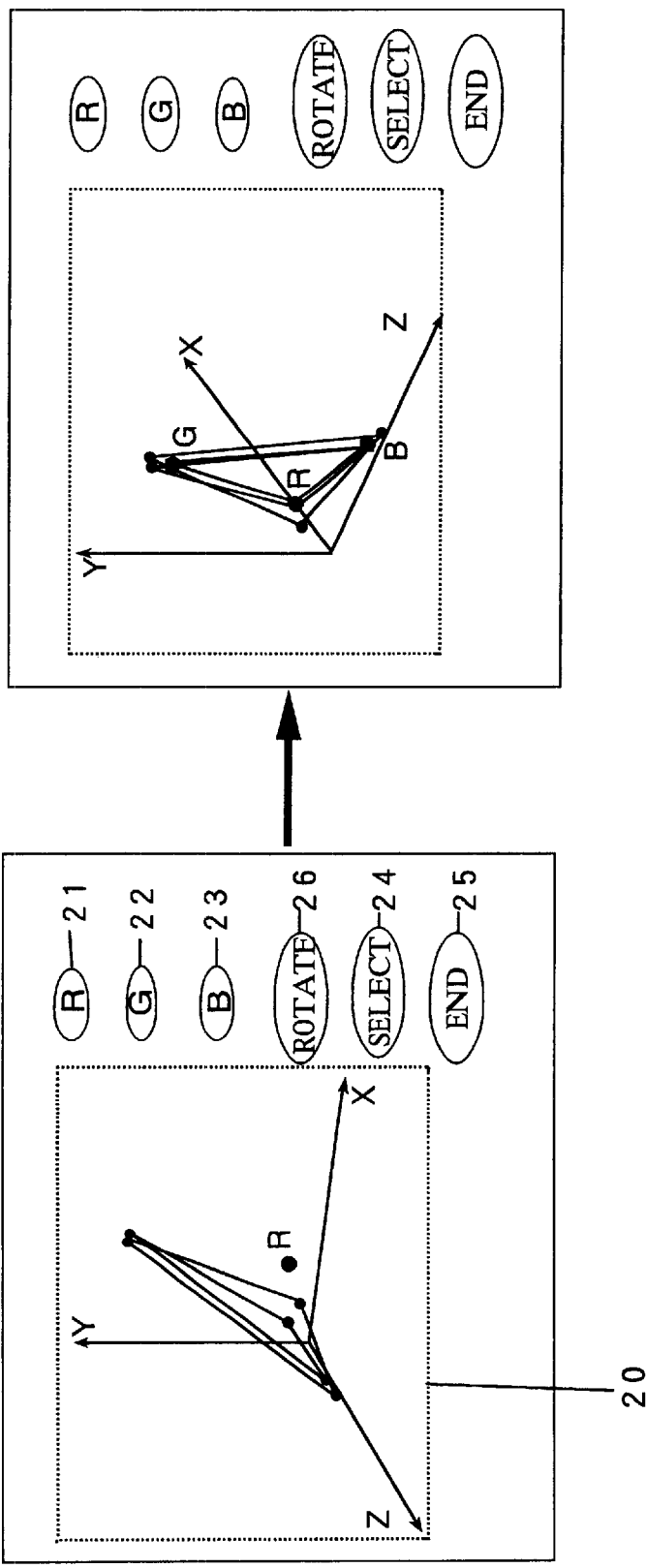
FIG. 11 illustrates the target color decided by the color calibration and screen of display monitor showing the result of colorimetry.

FIG. 11 illustrates two of the screens of the display monitor 11 connected to the system control unit 6.

The screen on the left illustrates a status prior to deciding the target color, and the screen on the right illustrate a status after the target color has been decided. The colorimetry results for each screen unit are illustrated on the 3-dimensional coordinates 20. The 3-dimensional coordinates can rotate. In FIG. 11, for the purpose of simplifying the drawing, the colorimetry results from the two screen units are being displayed. The operator can see the colorimetry results on the 3-dimensional coordinates 20, when setting the target color to have a maximum common color reproduction region for all the screen units, for example. When a button R is clicked using the mouse 12, a letter R and a black dot "●" appears on the 3-dimensional coordinates 20. Using the mouse 12, the operator can drag the black dot "●" on the 3-dimensional coordinates 20. At this time, when a position of the black dot is difficult to see on the 3-dimensional display from a particular direction, then a rotate button 26 is clicked using the mouse 12, so that the coordinate system will rotate. A several display patterns of the coordinate system are available, and every time the rotate button is clicked, the displayed coordinate system is changed to a next display pattern. Also, when it is difficult to set a point in the 3-dimensional space, then a limitation can be installed so that the XYZ tristimulus values of the target color is set only on sides and apexes of triangles formed by connecting three colorimetry values of the representing colors for each screen unit.

After the operator has dragged the black dot "●" to a XYZ tristimulus values point of the target color, when the select button 24 is clicked, the target color is decided for R as a coordinate value of the black dot "●". The target color is decided in the same manner for G and B, and when the end button is clicked, a triangle will be displayed with apexes indicating the XYZ tristimulus values of the target color, and the operator can recognize the target color that has been decided. This situation is illustrated on the right hand side of FIG. 11. All other processing such as calculation of the color conversion coefficient is same as embodiment 1.

On the other hand, without relying on the operator, the target color is also decided automatically.

According to the present embodiment, in the color reproduction region for all the display units, the target color is set so that the common color reproduction region can be maximum, such that the target color can be displayed by all the display units, and a strict color calibration becomes possible this way.

Also, according to the present embodiment, the operator recognizes the colorimetry results for all the display units appearing on the attached display monitor and decides the target color, therefore, the common color reproduction region for most of the display units can be set to the maximum simply by looking into the monitor.

EMBODIMENT 5

Embodiment 5 of the present invention is described with reference to the drawings.

Figure 12:
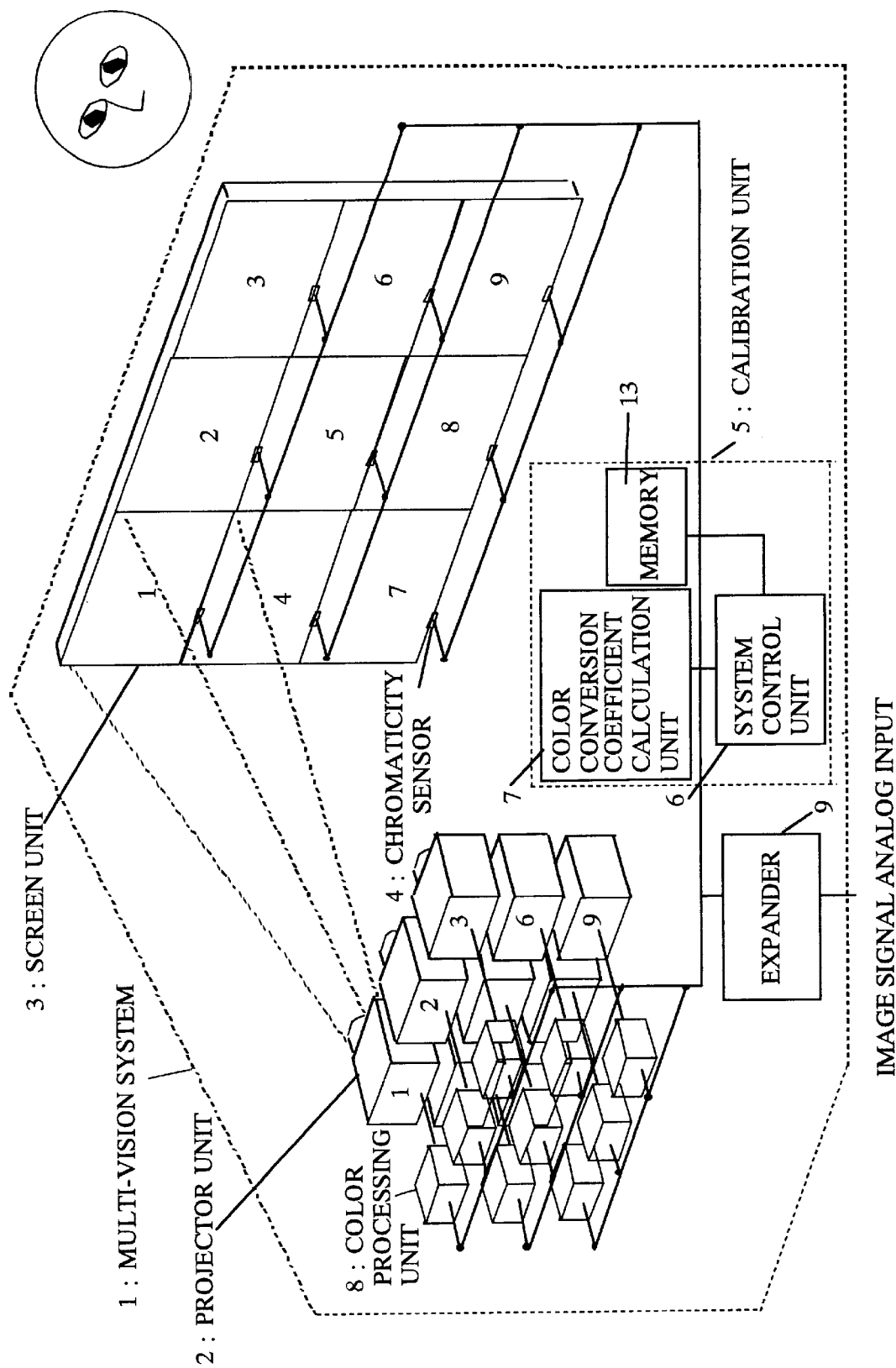
FIG. 12 is the whole block chart for embodiment 5 of the present invention.

FIG. 12 is the whole block chart of the multi-vision system provided with the color calibration function, showing one of the embodiments in the present invention.

The characteristic of the present invention being different from embodiment 1 is that the XYZ tristimulus values of the previous colorimetry is referred for a calibration from two times when setting the target color, and if there is a large difference between the present XYZ tristimulus values and the previous tristimulus values, then the calibration is executed.

An algorithm for deciding the execution of the calibration is described below with reference to the flow charts of FIGS. 13 and 14.

Figure 2:
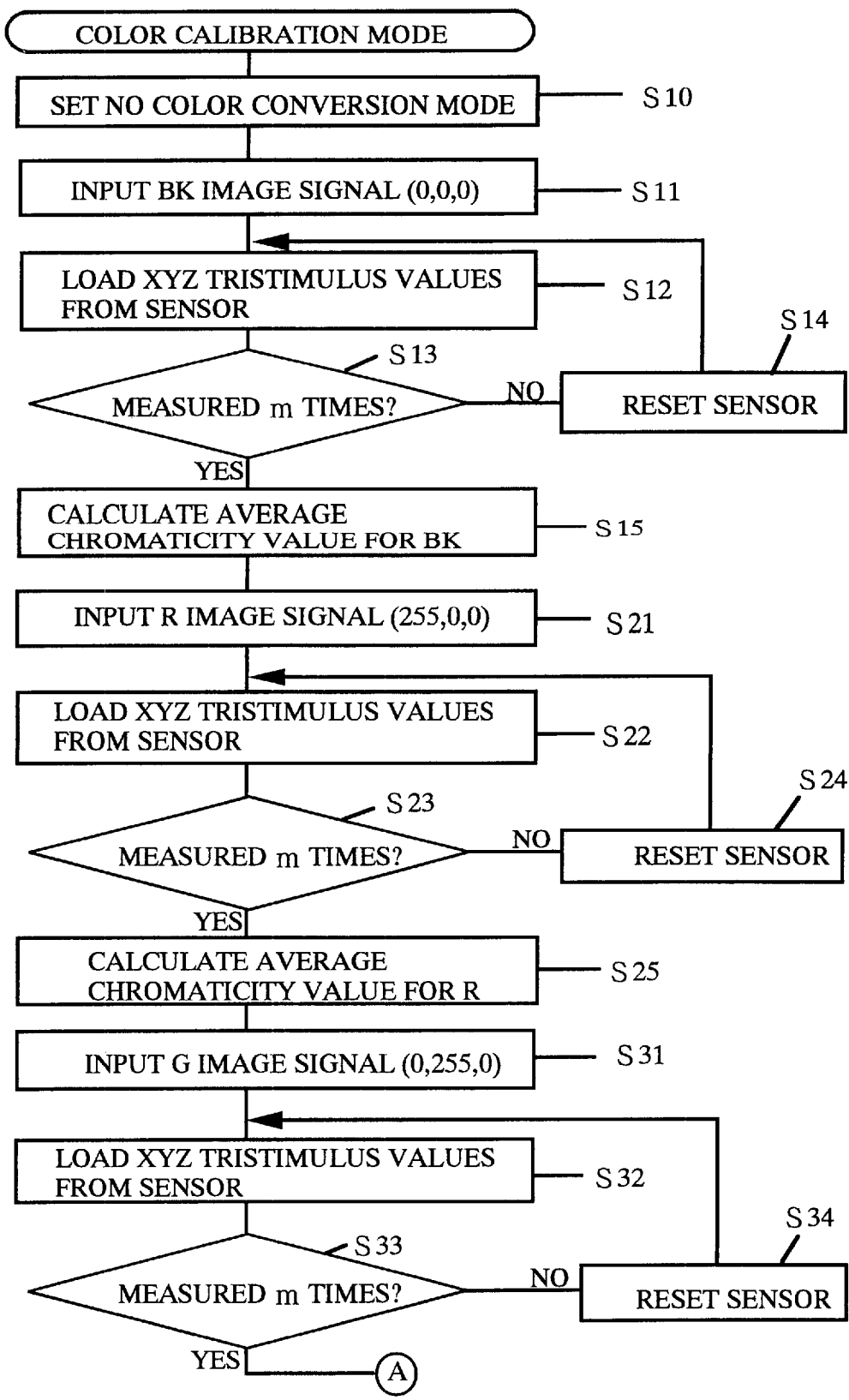
FIG. 2 is the flow chart of color calibration process for embodiment 1 of the present invention.
Figure 3:
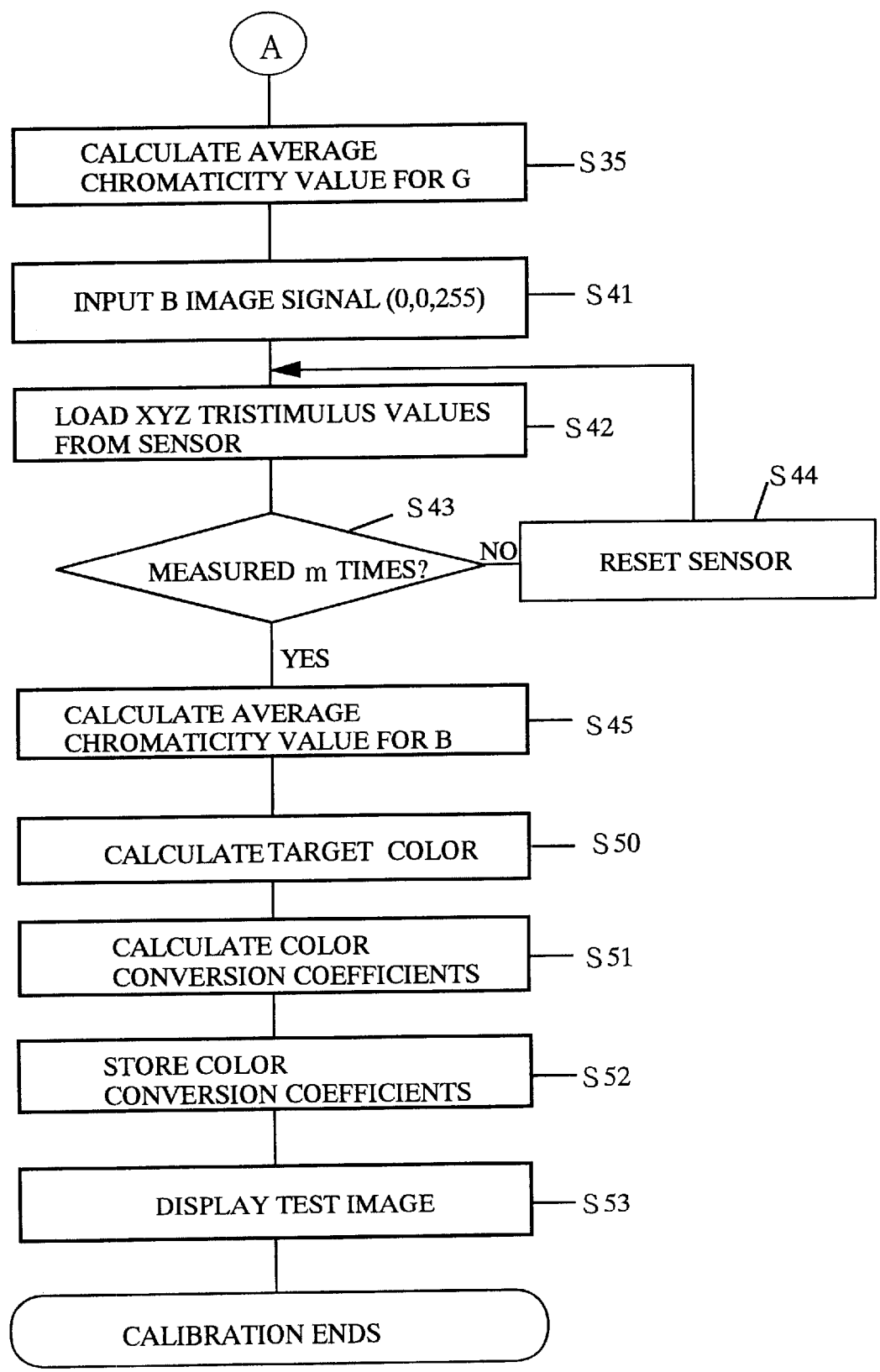
FIG. 3 is the flow chart of color calibration process for embodiment 1 of the present invention.
Figure 13:
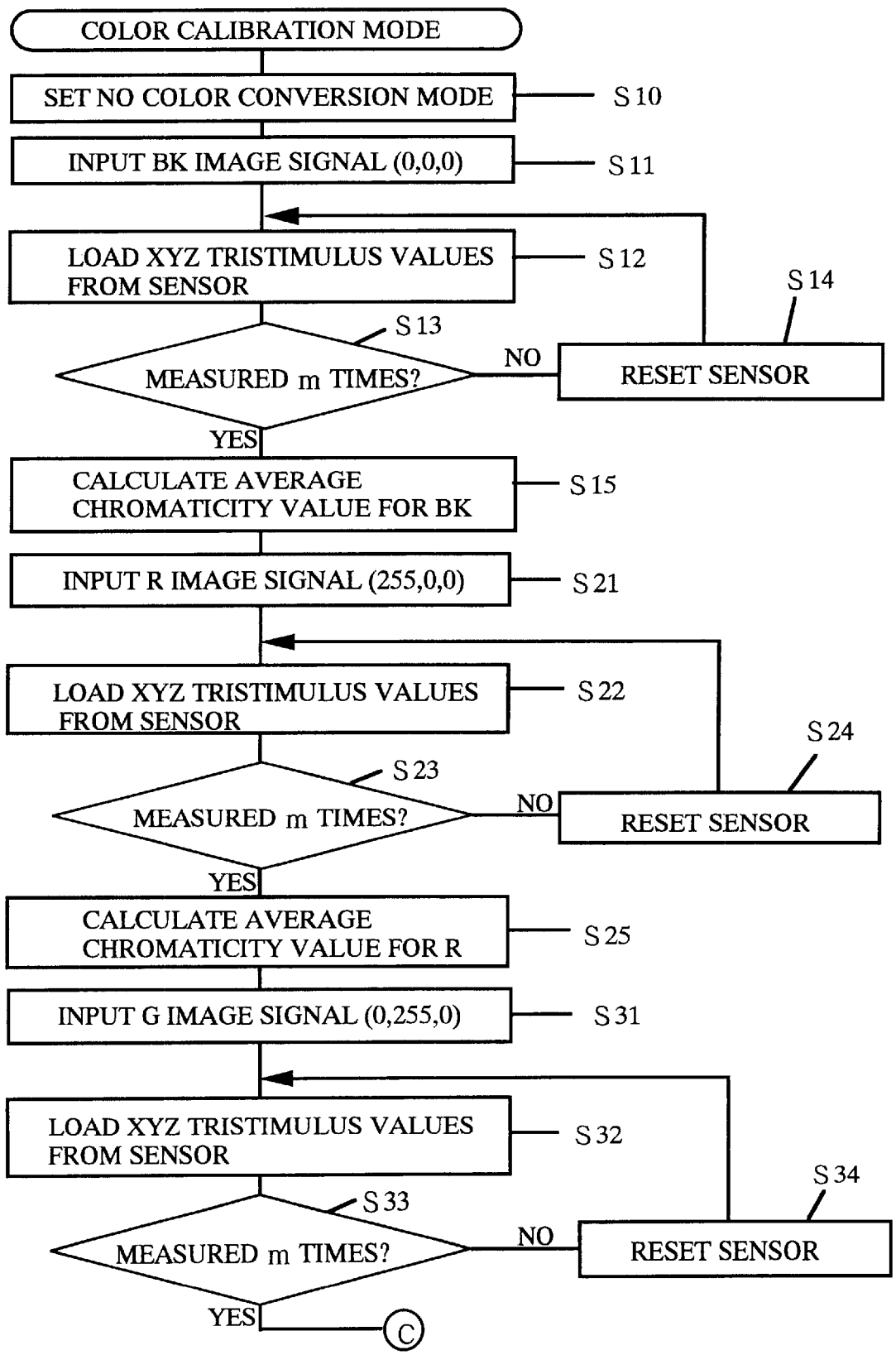
FIG. 13 is the flow chart of color calibration process for embodiment 5 of the present invention.
Figure 14:
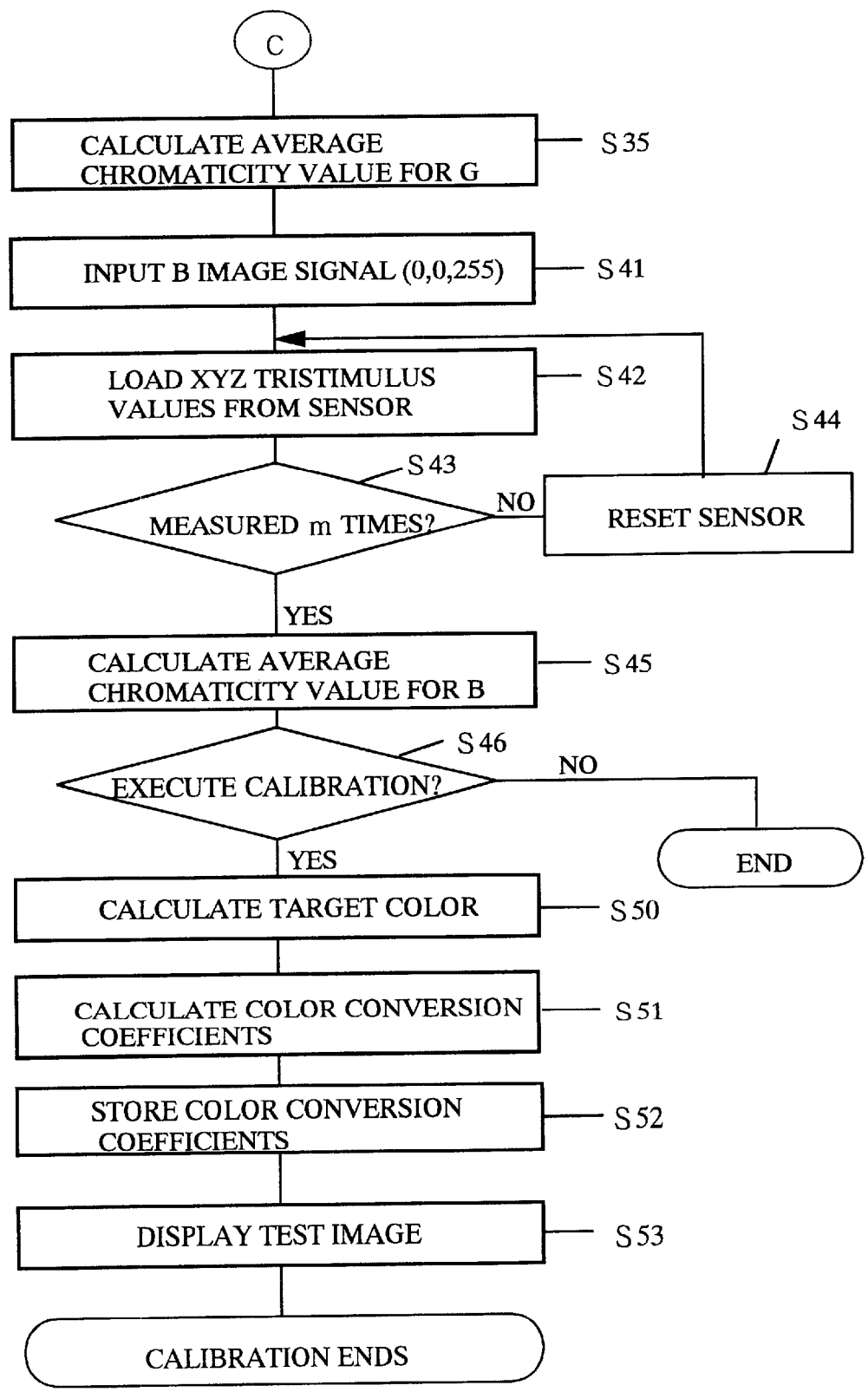
FIG. 14 is the flow chart of color calibration process for embodiment 5 of the present invention.
Figure 15:
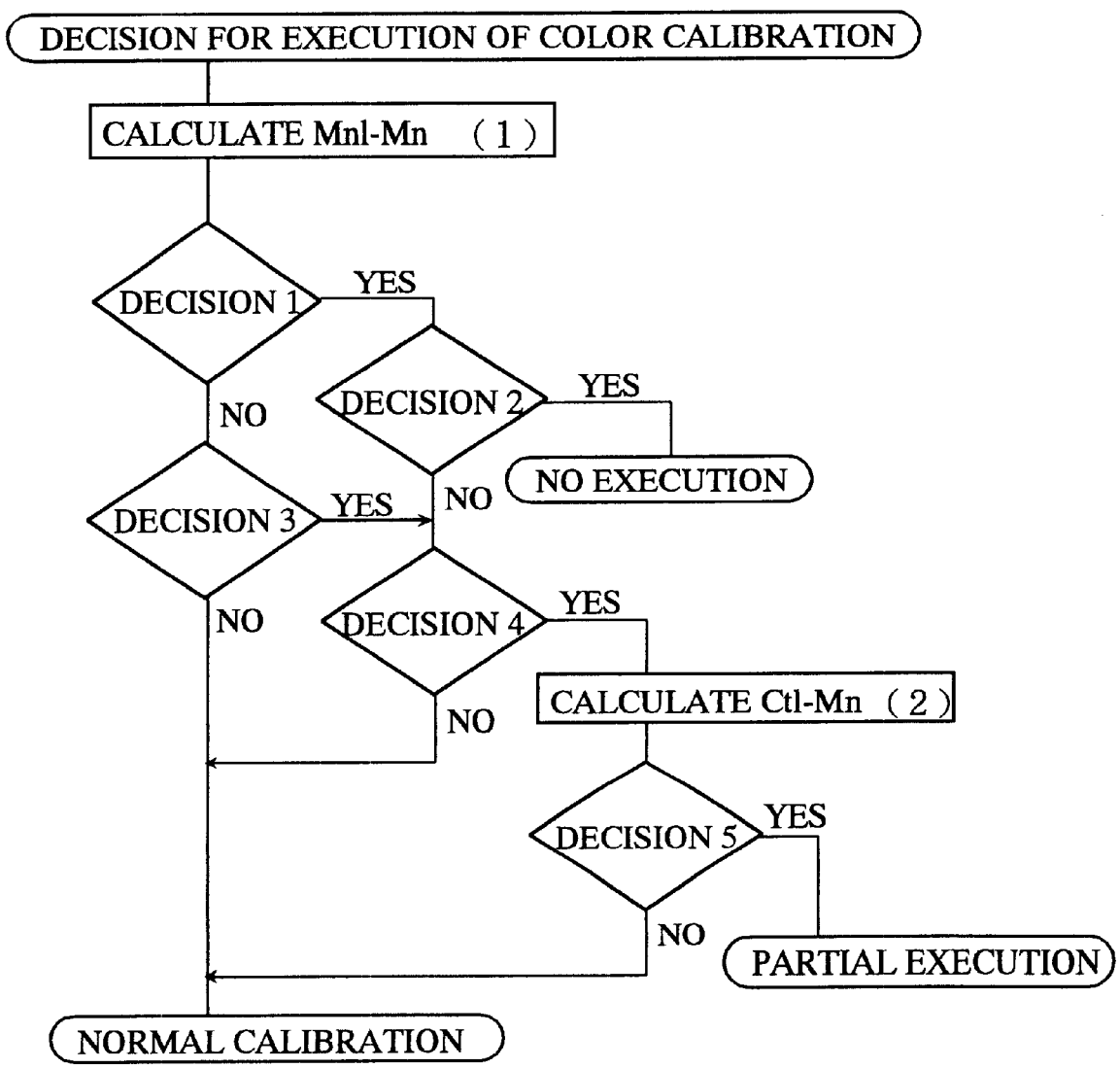
FIG. 15 is the flow chart for deciding calibration execution in embodiment 5 of the present invention.
Figure 16:
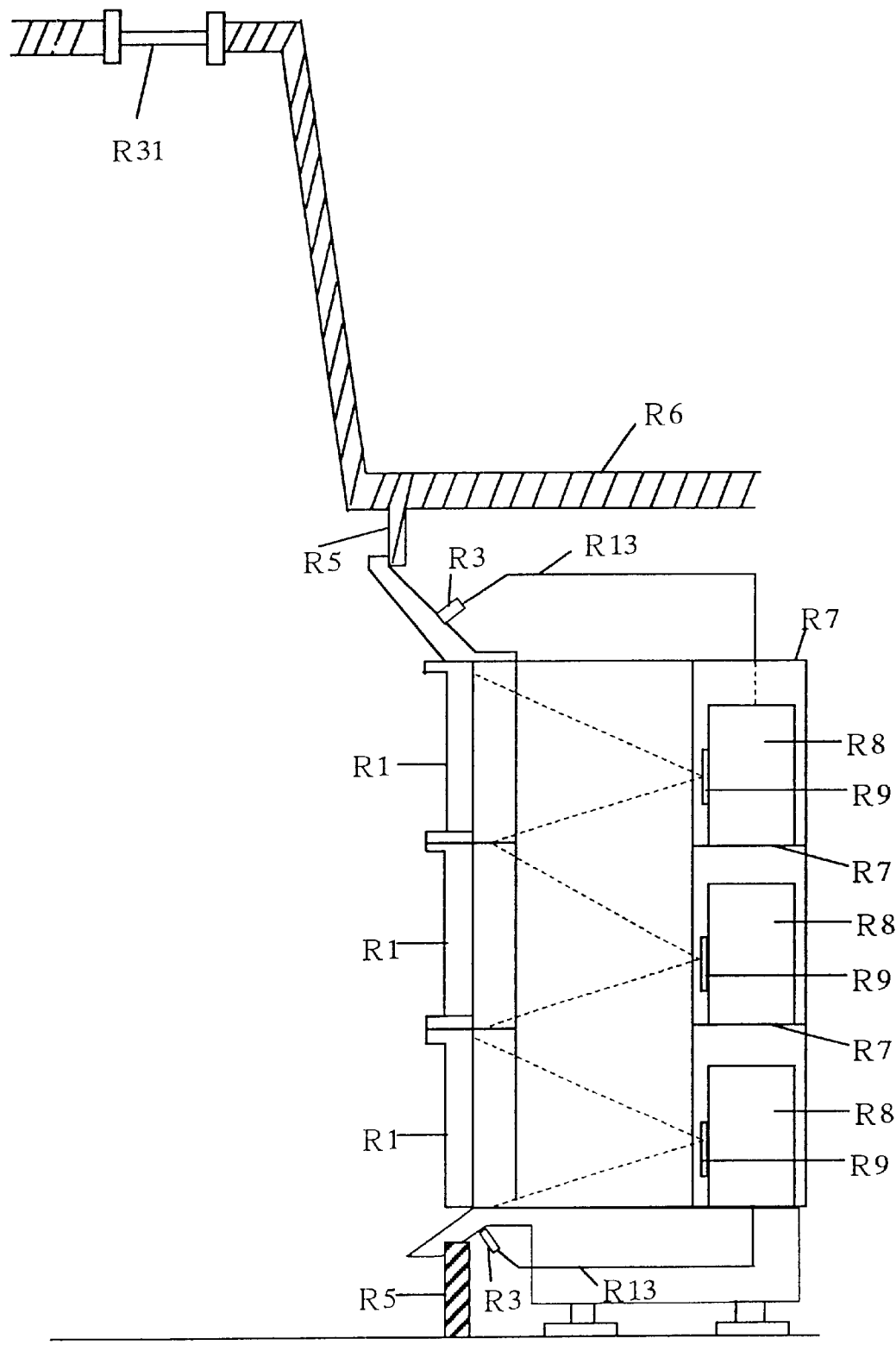
FIG. 16 illustrates the conventional multi-vision system.
Figure 17:
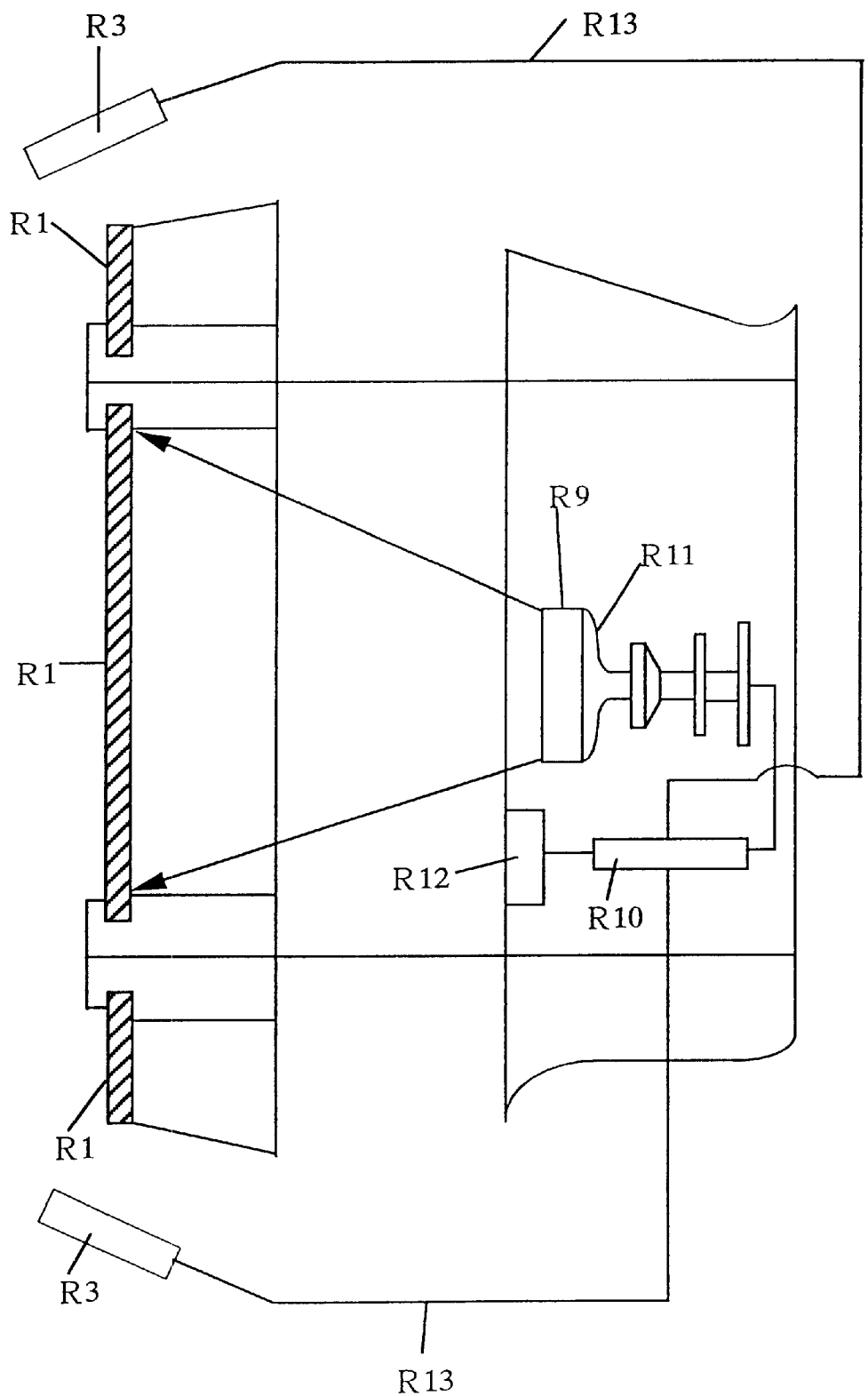
FIG. 17 illustrates the conventional multi-vision system.
Figure 18:
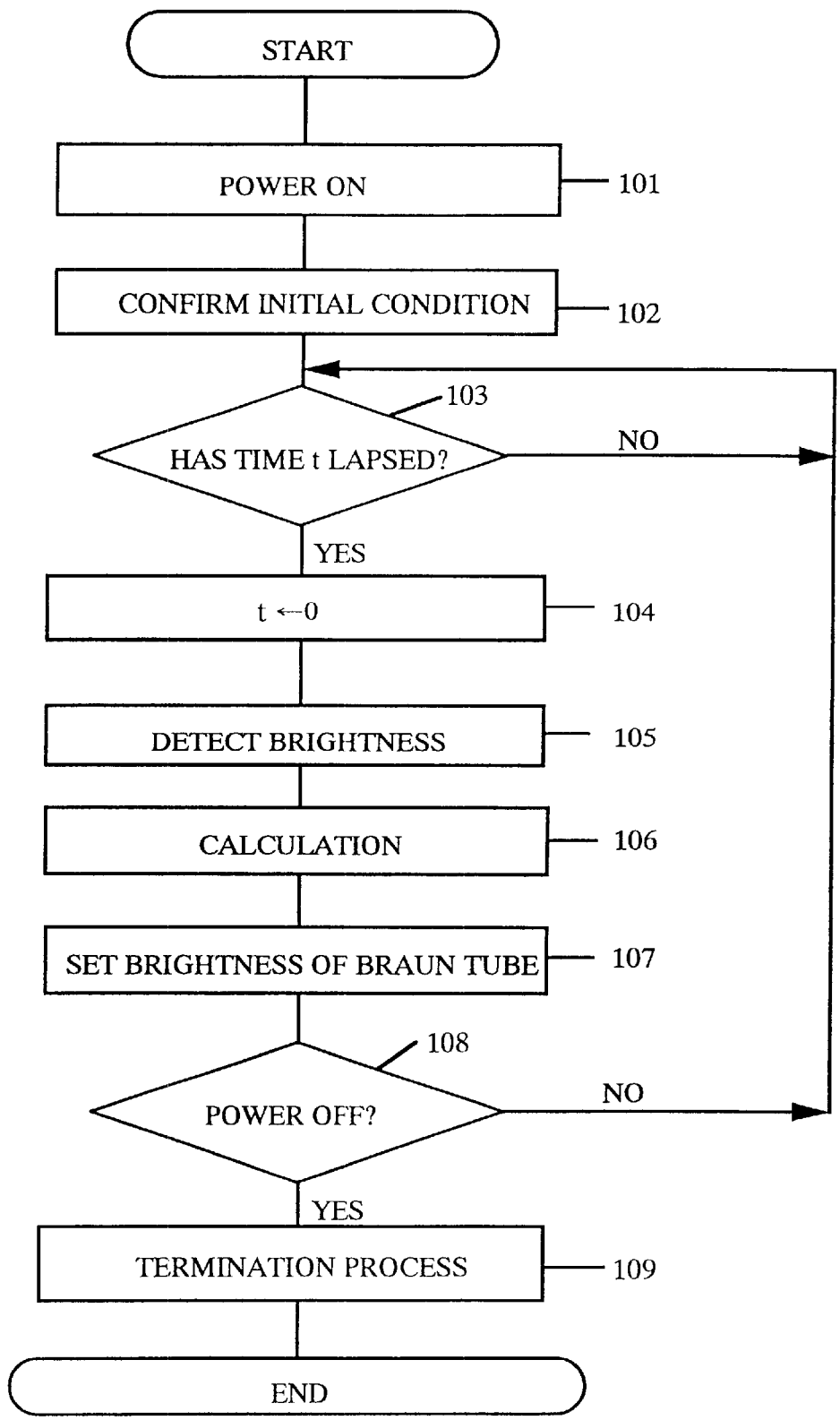
FIG. 18 illustrates an operation of the conventional multi-vision system.

Except for step S46, FIGS. 13 and 14 are same as FIGS. 2 and 3. The decision of whether to execute calibration or not in step S46 is done prior to the calculation of the target color (S50). A specific content of this decision is described according to the flow chart of FIG. 15.

First, for the XYZ tristimulus values of the primary colors from the previous color calibration is stored in a memory, a matrix taking into account the black drifting is expressed in equation 20 as $M_{nl}$.

$$M_{nl} = \begin{pmatrix} X_{nrl} - X_{nkl} & X_{ngl} - X_{nkl} & X_{nbl} - X_{nkl} \\ Y_{nrl} - Y_{nkl} & Y_{ngl} - Y_{nkl} & Y_{nbl} - Y_{nkl} \\ Z_{nrl} - Z_{nkl} & Z_{ngl} - Z_{nkl} & Z_{nbl} - Z_{nkl} \end{pmatrix} \quad \text{Equation 20}$$

The equation 20 defines a matrix expression of the XYZ tristimulus values of the three primary colors R, G and B for a previous nth display, taking into account the black drifting due to the dark current.

Also, the XYZ tristimulus values of the previous target color is expressed in a matrix of equation 21 as $C_{tl}$.

$$C_{tl} = \begin{pmatrix} X_{trl} - X_{tkl} & X_{tgl} - X_{tkl} & X_{tbl} - X_{tkl} \\ Y_{trl} - Y_{tkl} & Y_{tgl} - Y_{tkl} & Y_{tbl} - Y_{tkl} \\ Z_{trl} - Z_{tkl} & Z_{tgl} - Z_{tkl} & Z_{tbl} - Z_{tkl} \end{pmatrix} \quad \text{Equation 21}$$

The equation 21 defines a matrix expression of XYZ tristimulus values of the target color from the previous three primary colors R, G and B for the case of taking into account the black drifting due to the dark current Also, the matrix $M_n$ that takes into account the black drifting of the XYZ tristimulus values of the primary colors for the present colorimetry is expressed in the equation 18, and the target color $C_t$ is expressed in the equation 19.

At first, $M_{nl} - M_n$, is calculated from the previous colorimetry value and the present colorimetry value, and the calculated value $D_{Mn}$, is expressed in equation 22.

$$D_{Mn} = M_{nl} - M_n = \begin{pmatrix} d_{n11} & d_{n21} & d_{n31} \\ d_{n12} & d_{n22} & d_{n32} \\ d_{n13} & d_{n23} & d_{n33} \end{pmatrix} \quad \text{Equation 22}$$

The equation 22 defines a difference of $M_{nt}$ calculated from the previous colorimetry result of the equation 20 and $M_n$ calculated from the present colorimetry result of the equation 18.

Decision 1 decides whether the following condition is met "in all display units there are no absolute value of element of matrix $D_{Mn}$ which exceeds a threshold value th1". Equation 23 expresses this condition.

$$|dn_{ij}| \leq th1 \quad \text{Equation 23}$$

The equation 23 shows that the absolute value of element of matrix $D_{Mn}$ is smaller than a threshold value th1.

Decision 2 decides whether the following condition is met "for all display units, calculate addition of the absolute value of elements of matrix $D_{Mn}$ as a decision parameter P1 and the decision parameter P1 does not exceed a threshold value th2". Equation 24 expresses this condition.

$$P1 = \sum_i \sum_j |dn_{ij}| \leq th2 \qquad \text{Equation 24}$$

The equation 24 shows that the addition of the absolute values of elements of matrix $D_{Mn}$ is smaller than the threshold value th2.

When both decisions 1 and 2 are met, it is decided that the present colorimetry result is no different from the previous colorimetry result, so the color calibration is not executed.

Decision 3 decides whether the following condition is met "a number of display units that did not meet the equation 23 do not exceed a threshold value th3". When there are more display units that did not meet the equation 23, that is, when there are more display units that had change to a certain extent, calibration is executed as normal.

Decision 4 decides whether the following condition is met "a number of display units that did not meet the equation 24 do not exceed a threshold value th4". When there are more display units that did not meet the equation 24, that is, when there are more display units that had change to a certain extent, calibration is executed as normal.

Decision 5 calculates $C_{tl}-M_n$ for comparing the XYZ tristimulus values of the previous target color and the present colorimetry value, and the calculated value $D_{Cn}$ is expressed in equation 25.

$$D_{Cn} = C_{tl} - M_n = \begin{pmatrix} c_{n11} & c_{n21} & c_{n31} \\ c_{n12} & c_{n22} & c_{n32} \\ c_{n13} & c_{n23} & c_{n33} \end{pmatrix} \qquad \text{Equation 25}$$

The equation 25 defines a difference of the XYZ tristimulus values of matrix $C_{tl}$ for the previous target color (equation 21) and the present colorimetry result $M_n$ (equation 18).

Decision 5 decides whether the following condition is met "for all display units, calculate addition of absolute value of elements of matrix $D_{Cn}$ factor as a decision parameter P2, and the decision parameter P2 does not exceed a threshold value th5". This is specifically expressed in the equation below.

$$P2 = \sum_i \sum_j |cn_{ij}| \leq th5 \qquad \text{Equation 26}$$

The equation 26 shows that the addition of the absolute values of elements of matrix $D_{Cn}$ of the equation 25 is smaller than the threshold value th5.

If the decision 5 is "yes", color calibration is executed to display units other than the display units that have met all of the equations 23, 24 and 26. At this time, the color conversion coefficient is calculated using the previous value $C_{tl}$ as the target color.

According to the present embodiment, a colorimetry value of each display unit and a chromaticity value of the target color is stored in the memory, and a next colorimetry value obtained for the next calibration is compared with a previous colorimetry value, or with the chromaticity value of the target color, then only when there is a difference to a certain extent between the compared values the calibration is executed, such that an unnecessary processing is not involved.

Also, according to the present embodiment, a colorimetry value of each display unit and a chromaticity value of the target color are stored in the memory, and a next colorimetry value obtained for the next calibration is compared with a previous colorimetry value, or with the chromaticity value of the target color, and the display unit with a difference in the compared values to a certain extent is selected automatically, and only for the selected display unit the color calibration is performed, such that unnecessary processing is not involved.

Followings are the related technologies.

(1) The Japanese unexamined patent publications hei9-27916, hei6-311428, hei5-119752, and hei7-191649 disclose techniques on a color adjustment of color image, however, none of these publications contain configuration of the colorimetry sensor, and therefore, does not have the characteristic of the present invention that uses the colorimetry sensor which performs colorimetry of the color of the display unit for the color adjustment.

(2) Arrangement of the sensors disclosed in Japanese unexamined patent publication sho63-261327 is similar to the present invention, however, the following points are considered different.

As a color calibration, the present invention combines all three properties of the color (lightness/chroma/hue), however, the disclosed content of Japanese unexamined patent publication sho63-2613276 is an adjustment of the hue only.

The present invention develops the color calibration for the multi-vision comprising a plurality of the display units so that the target color is set automatically, however, the disclosed content of Japanese unexamined patent publication sho63-261327 is the color adjustment for a single display unit only.

(3) Japanese unexamined patent publication hei4-243393 describes the chromaticity sensor, however, this is for measuring a color temperature of extraneous light, and differs from the colorimetrysensor of the present invention in a point that it does not perform colorimetry for the color of the display.

(4) Sensor mentioned in Japanese unexamined patent publication hei5-236371 is for detecting the change in the brightness in a periphery of TV receiver, and this is different from the sensor of the present invention which performs colorimetry of the display unit.

(5) The disclosed content of Japanese unexamined patent publication hei5-236371 is for adjusting a color for camera, and the sensor mentioned in the disclosed content of Japanese unexamined patent publication hei5-236371 calculates the colorimetry value from a photometry result at capturing of images, and the information is used as a color correction information upon printing. That is, it discloses performing of the colorimetry and the correction of extraneous light upon imaging. The present invention is for performing correction to a color characteristic of the machine itself called display. Therefore, the present invention can adjust the color so that the output from a plurality of devices will all be the same color.

INDUSTRIAL APPLICABILITY

According to the present invention, it performs colorimetry for the representing color displayed in a display unit without the color conversion, calculates the color conversion coefficients so that the color of the display unit will be the target color, and stores to the color processing unit, therefore, the color calibration is automatically performed, as a result, the display unit can convert and display the aiming target color or the color close to the target color.

Also, according to the present invention, for the multi-vision system comprising a plurality of the display units, the representing colors are displayed on the plurality of the display units without the color conversion. The color conversion coefficient is calculated from the colorimetry results so that the representing colors of the display units will be the target color, and is stored to the color processing units, therefore, the color calibration is automatically performed, and as a result, the plurality of the display units can convert color and can display the aiming target color or the color close to the target color.

Further, according to the present invention, the sensors are installed inside the multi-vision such that the color calibration device is implemented without making the device large more than necessary and at a low cost.

Furthermore, according to the present invention, the sensors are placed outside of the multi-vision, therefore, it can perform colorimetry for the color of the display units and not the light source, and further the position for colorimetry can be set to the central part of the display units, such that the accurate colorimetry which leads to the accurate color calibration becomes possible.

Furthermore, according to the present invention, the sensors are placed outside of the multi-vision to scan the multi-vision in parallel, therefore, colorimetry of all the display units using a smaller number of sensors than the number of the display units becomes possible, such that the cost can be reduced. Also, the colorimetry point of single display unit can be shifted for performing colorimetry, so that when taking the average value of the colorimetry values, it becomes possible to correct an unbalance in the single display unit, and the color calibration can be performed by focusing on the arbitrary point.

Furthermore, according to the present invention, the aiming target color is decided from the colorimetry results of all the display units so that the common color reproduction region of all the display units are set to maximum, and because the target color is the color which can be displayed by all the display units, a strict color calibration will become possible.

Furthermore, according to the present invention, the aiming target color is decided by the operator recognizing the colorimetry results of all the display units displayed on the attached display monitor, therefore, setting the common color reproduction region of most display units are visually set to maximum.

Furthermore, according to the present invention, the colorimetry value with a smallest chroma is automatically set from the colorimetry results of all display units, therefore, from a viewpoint of chroma, a strict color calibration is automatically performed, and problem of narrowing down of the color reproduction region when simply seeking for the common color reproduction region is solved.

Furthermore, according to the present invention, the average value (center of gravity) of the colorimetry values for all display units are automatically calculated from the calorimetry results of all display units, and aiming target color is set this way, therefore, the color calibration is performed automatically such that the problem of narrowing down of the color reproduction region when simply seeking for the common color reproduction region is solved.

Furthermore, according to the present invention, the colorimetry results of all display units and the XYZ tristimulus values of the target color are stored in the memory, and by comparing with the next colorimetry results, calibration is executed only when the calibration need to be executed such that unnecessary processing is not involved.

Furthermore, according to the present invention, the calorimetry results of all display units and the XYZ tristimulus values of the target color are stored in the memory, and by comparing with the next calorimetry results, calibration is executed for the display units that need to be executed such that unnecessary processing is not involved.

What is claimed is:

1. A multi-vision system including a plurality of display units, comprising:

a sensor for performing colorimetry of display colors from the plurality of display units;

a color conversion coefficient calculation unit for calculating a color conversion coefficient to calibrate a display color of each display unit using colorimetry values obtained from the sensor by performing calorimetry for the display colors of the plurality of display units; and a color processing unit for performing a color conversion of the display color of each display unit by using a calculated color conversion coefficient from the color conversion coefficient calculation unit.

2. The multi-vision system according to claim 1, wherein the color processing unit receives a signal of at least one of representing colors, and displays the representing color on the display units without a color conversion;

wherein the sensor performs calorimetry for the representing color of the plurality of display units displayed by the color processing unit; and wherein the color conversion coefficient calculation unit calculates the color conversion coefficient of each display unit for color converting the representing color measured by the sensor to a pre-determined target color, and outputs a calculated color conversion coefficient to the color processing unit.

3. The multi-vision system according to claim 2, wherein the sensor is positioned inside the multi-vision system and in a non-display area that is in between the plurality of display units.

4. The multi-vision system according to claim 2, wherein the sensor is positioned outside of the multi-vision system.

5. The multi-vision system according to claim 2, wherein the sensor is placed so as to be able to scan in parallel against the plurality of display units.

6. The multi-vision system according to claim 2, wherein the color conversion coefficient calculation unit decides a signal value of at least one of the representing colors, and takes a colorimetry value that has a maximum common color reproduction region in a color reproduction region of the plurality of display units as the target color of the representing color from within the colorimetry values of the representing color when displaying the representing color to the plurality of display units without a color conversion.

7. The multi-vision system according to claim 2, wherein the color conversion coefficient calculation unit displays the colorimetry value of at least one of the representing colors of the plurality of display units on a chromaticity coordinate, and decides the target color based on a specified chromaticity coordinate.

8. The multi-vision system according to claim 2, wherein the color conversion coefficient calculation unit decides a signal value of at least one of the representing colors, and takes a colorimetry value that has a smallest chroma as the target color of the representing color from within the colorimetry values of the representing color when displaying the representing color to the plurality of display units without a color conversion.

9. The multi-vision system according to claim 2, wherein the color conversion coefficient calculation unit decides a signal value of at least one of the representing colors, and, as the target color of the representing color, takes an average value of the colorimetry values of the representing color when displaying the representing color to the plurality of display units without a color conversion.

10. The multi-vision system according to claim 2 comprising a memory for storing a chromaticity value of the target color and a colorimetry value of each display unit,
wherein the color conversion coefficient calculation unit compares a chromaticity value obtained in a next calibration with one of the chromaticity value of the target color and a colorimetry value of a previous calibration, and the color conversion coefficient is calculated when there is a certain amount of difference between compared values.

11. The multi-vision system according to claim 2 comprising a memory for storing the chromaticity value of the target color and a colorimetry value of each display unit,
wherein the color conversion coefficient calculation unit compares the chromaticity value obtained in the next calibration with one of the previous colorimetry value and the chromaticity value of the target color, selects a display unit that has a certain amount of difference between the compared values, and calculates the color conversion coefficient of a selected display unit.

12. A display unit, for displaying color by a mixture of primary colors, comprising:
a sensor for performing colorimetry of a display color of the display unit;
a color conversion coefficient calculation unit for calculating color conversion coefficients to calibrate the display color of the display unit by using the colorimetry value obtained from the sensor by performing colorimetry for the display color of the display unit; and
a color processing unit for performing a color conversion of the display color of the display unit by using a calculated color conversion coefficient from the color conversion coefficient calculation unit;
wherein the color processing unit receives a signal of at least one of representing colors, and displays a representing color on the display unit without a color conversion;
wherein the sensor performs colorimetry for the representing color on the display unit displayed by the color processing unit; and
wherein the color conversion coefficient calculation unit calculates the color conversion coefficients of the display unit for color converting the representing color measured by the sensor to a pre-determined target color, and outputs a calculated color conversion coefficient to the color processing unit.

13. The display unit according to claim 12, wherein the color conversion coefficient calculation unit calculates the color conversion coefficients by using a 3-dimensional space.

14. The display unit according to claim 13, wherein the color conversion coefficient calculation unit calculates the color conversion coefficients by using XYZ tristimulus values of an obtained color from the mixture of three primary colors in an additive mixture of color stimuli model.

15. A color calibration method of the multi-vision system including a plurality of display units, comprising:
a sensor step for performing colorimetry of display colors from the plurality of display units;
a color conversion coefficient calculating step for calculating color conversion coefficients to calibrate a display color of each display unit using colorimetry values obtained from the sensor by performing colorimetry for the display colors of the plurality of display units measured by the sensor step; and
a color processing step for performing a color conversion of the display color of each display unit by using calculated color conversion coefficients from the color conversion coefficient calculating step.

16. The color calibration method of the multi-vision system according to claim 15,
wherein the color processing step includes a step of receiving a signal of at least one of representing colors, and a step of displaying the representing color on the display units without a color conversion,
wherein the sensor step includes a step of performing colorimetry for the representing color of the plurality of display units displayed by the color processing step; and wherein the color conversion coefficient calculating step includes a step of calculating the color conversion coefficients of each display unit for color converting the representing color measured by the sensor to a pre-determined target color, and a step of outputting a calculated color conversion coefficient to the color processing step.

17. The multi-vision system according to claim 1, wherein said color conversion coefficient calculation unit calculates the color conversion coefficient of each display unit so that color conversion performed by said color processing unit achieves a display color for said plurality of display units that matches the same target color.

18. The multi-vision system according to claim 17, wherein said target color is calculated as a function of the colorimetry values for all of said plurality of display units.

19. The color calibration method of the multi-vision system according to claim 15, wherein said color conversion coefficient calculating step calculates the color conversion coefficient of each display unit so that color conversion performed by said color processing step achieves a display color for said plurality of display units that matches the same target color.

20. The color calibration method of the multi-vision system according to claim 19, wherein said target color is calculated as a function of the colorimetry values for all of said plurality of display units.

* * * * *